(12) United States Patent
Zerrad et al.

(10) Patent No.: US 11,818,129 B2
(45) Date of Patent: Nov. 14, 2023

(54) COMMUNICATING WITH CLIENT DEVICE TO DETERMINE SECURITY RISK IN ALLOWING ACCESS TO DATA OF A SERVICE PROVIDER

(71) Applicant: Lookout, Inc., Boston, MA (US)

(72) Inventors: Réda Zerrad, San Francisco, CA (US); Dhruva Gopal, Campbell, CA (US); Sneha Sachidananda, San Mateo, CA (US); Dayyan Yoon Lord, Oakland, CA (US); Varun Shimoga Prakash, Fremont, CA (US); Christopher Brandon Leach, Pacifica, CA (US); Brian James Buck, Livermore, CA (US); Jeroen Martijn Wijdogen, Haarlem (NL)

(73) Assignee: Lookout, Inc., Boston, MA (US)

(*) Notice: Subject to any disclaimer, the term of this patent is extended or adjusted under 35 U.S.C. 154(b) by 305 days.

(21) Appl. No.: 16/894,566

(22) Filed: Jun. 5, 2020

(65) Prior Publication Data

US 2020/0304503 A1 Sep. 24, 2020

Related U.S. Application Data

(63) Continuation-in-part of application No. 16/666,063, filed on Oct. 28, 2019, now Pat. No. 10,785,230.
(Continued)

(51) Int. Cl.
*H04L 9/40* (2022.01)
*H04W 12/63* (2021.01)

(52) U.S. Cl.
CPC ............ *H04L 63/10* (2013.01); *H04W 12/63* (2021.01)

(58) Field of Classification Search
CPC ... H04L 63/10; H04L 63/108; H04L 63/0823; G06F 8/61
See application file for complete search history.

(56) References Cited

U.S. PATENT DOCUMENTS

| 7,539,862 B2 | 5/2009 | Edgett et al. |
| 8,365,252 B2 | 1/2013 | Mahaffey et al. |

(Continued)

OTHER PUBLICATIONS

Hany F. Atlam et al, Developing an adaptive Risk-based access control model for the Internet of Things, IEEE (Year: 2017).*

(Continued)

*Primary Examiner* — Shanto Abedin
(74) *Attorney, Agent, or Firm* — Greenberg Traurig

(57) ABSTRACT

An identity broker receives a request for access by a client device to a service provided by a server. In response to the request, the identity broker communicates with a client device to determine whether a security risk is associated with allowing the client device to access data of a service provider. If the client device is secure, the identity broker sends an authentication request to an identity provider. After the identity provider authenticates the client device, the identity broker passes the authentication to the server, which establishes a session with the client device to provide the service. The security state of the client continues to be monitored to determine whether access should continue to be permitted to data associated with a service provider.

21 Claims, 8 Drawing Sheets

Related U.S. Application Data which is a continuation-in-part of application No. 16/296,060, filed on Mar. 7, 2019, now Pat. No. 10,491,603.

(56) References Cited

U.S. PATENT DOCUMENTS

| | | | | |
|---|---|---|---|---|
| 9,948,612 | B1* | 4/2018 | Jawahar | H04L 63/0272 |
| 10,003,600 | B2* | 6/2018 | Karunakaran | H04W 12/06 |
| 10,362,021 | B2* | 7/2019 | Newell | H04L 9/14 |
| 10,785,230 | B1 | 9/2020 | Zerrad et al. | |
| 2006/0224742 | A1* | 10/2006 | Shahbazi | H04L 63/20 709/226 |
| 2009/0300707 | A1 | 12/2009 | Garimella et al. | |
| 2011/0314532 | A1 | 12/2011 | Austin et al. | |
| 2012/0084836 | A1* | 4/2012 | Mahaffey | H04L 63/102 726/3 |
| 2013/0169434 | A1* | 7/2013 | McCown | H04M 11/04 340/5.2 |
| 2014/0237131 | A1* | 8/2014 | Chan | H04L 67/141 709/228 |
| 2015/0172060 | A1 | 6/2015 | Mahaffey et al. | |
| 2016/0142392 | A1 | 5/2016 | Ahmed et al. | |
| 2016/0219060 | A1* | 7/2016 | Karunakaran | H04W 12/37 |
| 2016/0344736 | A1* | 11/2016 | Khait | H04L 63/102 |
| 2017/0289134 | A1* | 10/2017 | Bradley | H04L 63/105 |
| 2017/0339176 | A1* | 11/2017 | Backer | H04L 63/1425 |
| 2018/0234464 | A1 | 8/2018 | Sim et al. | |
| 2018/0336359 | A1* | 11/2018 | Lakhani | G06F 21/31 |
| 2018/0359244 | A1 | 12/2018 | Cockerill et al. | |
| 2019/0223021 | A1* | 7/2019 | Raju | H04L 63/10 |
| 2019/0281046 | A1* | 9/2019 | Xu | G06F 16/24552 |
| 2020/0004946 | A1* | 1/2020 | Gilpin | H04L 63/10 |
| 2020/0287910 | A1 | 9/2020 | Zerrad et al. | |

OTHER PUBLICATIONS

R. J. Hulsebosch et al, Context sensitive access control, ACM (Year: 2005).*

Extended European Search Report, EP20204056.4, dated Dec. 14, 2020.

Title: Monitoring Security of a Client Device to Provide Continuous Conditional Server Access, U.S. Appl. No. 16/666,063, filed Oct. 28, 2019, Allowed—Notice of Allowance Not Status dated May 21, 2020 Yet Mailed.

* cited by examiner

COMMUNICATING WITH CLIENT DEVICE TO DETERMINE SECURITY RISK IN ALLOWING ACCESS TO DATA OF A SERVICE PROVIDER

RELATED APPLICATIONS

This is a continuation-in-part application of U.S. Non-Provisional application Ser. No. 16/666,063, filed Oct. 28, 2019, entitled "MONITORING SECURITY OF A CLIENT DEVICE TO PROVIDE CONTINUOUS CONDITIONAL SERVER ACCESS," by Zerrad et al., which itself is a continuation-in-part application of U.S. Non-Provisional application Ser. No. 16/296,060, filed Mar. 7, 2019, issued as U.S. Pat. No. 10,491,603 on Nov. 26, 2019, entitled "SOFTWARE COMPONENT SUBSTITUTION BASED ON RULE COMPLIANCE FOR COMPUTING DEVICE CONTEXT," by Robinson et al., the entire contents of which applications are incorporated by reference as if fully set forth herein.

FIELD OF THE TECHNOLOGY

At least some embodiments disclosed herein relate to monitoring security for a computing device, and more particularly, but not limited to monitoring security of a client device to provide the client device with continuous conditional access to a server.

BACKGROUND

Some governments have laws regulating a certain maximum level of encryption in their territories. For example, China is a difficult environment for cryptography use and regulation. Importation and exportation of cryptography products are both highly regulated. Encryption is regulated primarily by the National Commission on Encryption Code Regulations (NCECR). Encryption products cannot be sold or imported in China without prior approval by NCECR. Furthermore, individuals and firms in China can only use cryptography products approved by the NCECR. This also applies to foreign individuals and firms operating in China, who must report details of their encryption systems to the NCECR.

The international standard for wireless connectivity, used worldwide, is the 802.11 standard of the Institute of Electrical and Electronics Engineers (IEEE). However, in 2003, the Chinese government announced the creation of a new Chinese standard for wireless LAN security (the WLAN Authentication and Privacy Infrastructure (WAPI)) and stated that wireless LAN (or Wi-Fi) systems sold in China would have to conform to the WAPI, not the 802.11, standard. Further, foreign companies that wished to sell Wi-Fi devices in China would have to co-produce their products with designated Chinese firms.

The WAPI standard was opposed by international IT firms, which viewed it as a protectionist tool used by the Chinese government. Another reason for opposing WAPI, however, was the fear that the domestic cryptography standard would create a functional key escrow system that would allow the Chinese government access to encrypted communications.

Restrictions on cryptography can affect companies operating in international markets that want to use cryptography to protect their data and communications; and also individuals in countries with restrictions on use of cryptography. Also, varying cryptography regulations worldwide place substantial burdens on information technology and security firms looking to move into new markets.

Restrictions on importation and use of cryptography can affect the operations of multinational firms in various ways. Network managers for firms in the West often design encryption technologies into their voice and data networks to protect the contents of their telephone calls, emails, documents, etc. When they use these same technologies abroad, they must tailor their systems to the restrictions of each country in which they operate, or they may violate local laws and regulations. This challenge is amplified when laws are unclear or inconsistently enforced, which is common in many developing countries.

For example, Chinese encryption regulations are often vague. Companies can expect the Chinese government to ask for details about the encryption that is being used—in addition to requiring them to appoint an encryption contact who will give the government the encryption keys when asked. Also, if a user encrypts data in China, the user has to provide the Chinese government the ability to access the keys. Because of such restrictions, many businesses do not use encryption in China, even if cryptography is a normal component of their IT infrastructure elsewhere. Also, in Russia the Federal Agency of Governmental Communications and Information has issued regulations requiring government approval to use encryption.

Restrictions on the import and use of cryptography affect businesses in several ways. If firms cannot use encryption devices to secure their data and communications in a given country, then their data in that country is put at risk. The situation is worse where regulations are unclear and inconsistently applied.

In addition to using cryptography to protect data as described above, mobile phones also are often managed using mobile application management to regulate some aspects of phone operation. For example, a user may be an employee of a firm that manages operations on the user's mobile phone using mobile application management implemented by a firm server.

Mobile application management (MAM) generally relates to software and services for provisioning and controlling access to internally developed and commercially available mobile apps used in business settings on both company-provided and "bring your own" smartphones and tablet computers.

Enterprise mobile application management is increasingly important due to the widespread adoption and use of mobile applications in business settings. The "bring your own device" (BYOD) phenomenon makes mobile application management more important, with personal PC, smartphone and tablet use in business settings (vs. business-owned devices) significantly increasing. Mobile application management enables corporate IT staff to download required applications, control access to business data, and remove locally-cached business data from the device if it is lost, or when its owner no longer works with the company. A growing demand for mobile apps from employees is prompting organizations to broaden beyond mobile device management to managing a growing number of mobile applications.

An end-to-end MAM solution can provide the ability to control the provisioning, updating and removal of mobile applications via an enterprise app store, monitor application performance and usage, and remotely wipe data from managed applications.

Mobile device management (MDM) is an industry term for the administration of mobile devices, such as smartphones, tablets, laptops and desktop computers. MDM is usually implemented with the use of a third party product that has management features for particular vendors of mobile devices.

MDM functionality can include over-the-air distribution of applications, data and configuration settings for all types of mobile devices, including mobile phones, smartphones, tablet computers, mobile printers, mobile POS devices, etc. Most recently laptops and desktops have been added to the list of systems supported. MDM tools are used for both company-owned and employee-owned (BYOD) devices across the enterprise or mobile devices owned by consumers. Consumer demand for BYOD is now requiring a greater effort for MDM and increased security for both the devices and the enterprise to which they connect. By controlling and protecting the data and configuration settings for all mobile devices in a network, MDM can reduce support costs and business risks.

With mobile devices becoming commonplace and increased numbers of applications becoming available for mobile devices, mobile monitoring is growing in importance. Numerous vendors help mobile device manufacturers, content portals and developers test and monitor the delivery of their mobile applications. This testing is done in real-time by simulating the action of thousands of customers and detecting and correcting bugs in the applications.

Typical solutions include a server component, which sends out the management commands to the mobile devices, and a client component, which runs on the mobile device and implements the management commands.

Central remote management uses commands sent over the air to mobile device handsets. An administrator at a mobile operator, an enterprise IT data center or a handset OEM can use an administrative console to update or configure any one handset, group or groups of handsets. The Open Mobile Alliance (OMA) has specified a platform-independent device management protocol called OMA Device Management. It is supported by several mobile devices, such as PDAs and mobile phones.

Over-the-air programming (OTA) capabilities are a component of mobile network operator and enterprise-grade mobile device management software. These include the ability to remotely configure a single mobile device, an entire fleet of mobile devices or any IT-defined set of mobile devices; send software and OS updates; remotely lock and wipe a device; and do remote troubleshooting. OTA commands are sent as binary messages, which are messages including binary data.

Mobile device management software enables corporate IT departments to manage the many mobile devices used across the enterprise; consequently, over-the-air capabilities are in high demand. Enterprises using OTA as part of their MDM infrastructure demand high quality in the sending of OTA messages. Present day MDM solutions offer both Software as a Service (SaaS) and on-premises models.

Mobile device management software can provide some degree of control and visibility for an administrator of mobile devices. IT managers ensure that mobile devices comply with their organization-specific IT policies and that the correct configuration is pushed to devices. Mobile device management software can permit users to self-enroll over-the-air. In addition to automatically configuring corporate policies and controls, IT can automatically setup WiFi, VPN and Exchange ActiveSync configurations on mobile devices.

An administrator (admin) defines and deploys policies for an organization. The admin may choose from a set of policy controls over password, device encryption, camera, Wi-Fi, VPN, etc. If a device is lost, stolen, retired or replaced, the admin can wipe data from the device to reduce the chance of data loss.

The admin can control and manage various devices from a single console. In some cases, MDM software can support a wide array of mobile devices, operating systems and technologies including Apple iOS, Apple Watch, Android, Windows Pro, Window Phone and Samsung KNOX. Whether Bring Your Own Device (BYOD), Corporate-Owned, Personally-Enabled (COPE) devices or a combination of both are utilized, customizable policies ensure the right policies are applied to the right device.

In one example, MDM software can support use cases including business users, remote workers, highly-sensitive users, shared devices, and kiosks. The MDM software can be deployed using a fully cloud-based deployment.

SUMMARY OF THE DESCRIPTION

Systems and methods for monitoring security of a client device to provide the client device with continuous conditional access to a server are described herein. Various embodiments are described below.

In one embodiment, a method includes: receiving, by an identity broker, a request regarding access by a client device to a service provided by a service provider; in response to receiving the request, determining, by the identity broker, an identity of the client device; determining, by at least one processor of the identity broker, whether the client device is in a secure state; in response to determining that the client device is in the secure state, sending, by the identity broker, an authentication request for the client device to an identity provider, the authentication request including the identity of the client device; receiving, by the identity broker from the identity provider in response to the authentication request, an authentication that authorizes the access by the client device; and in response to receiving the authentication from the identity provider, sending, by the identity broker, a communication to the service provider that approves the access by the client device.

The disclosure includes various methods and devices which perform the above methods and systems, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

DETAILED DESCRIPTION

Figure 1:
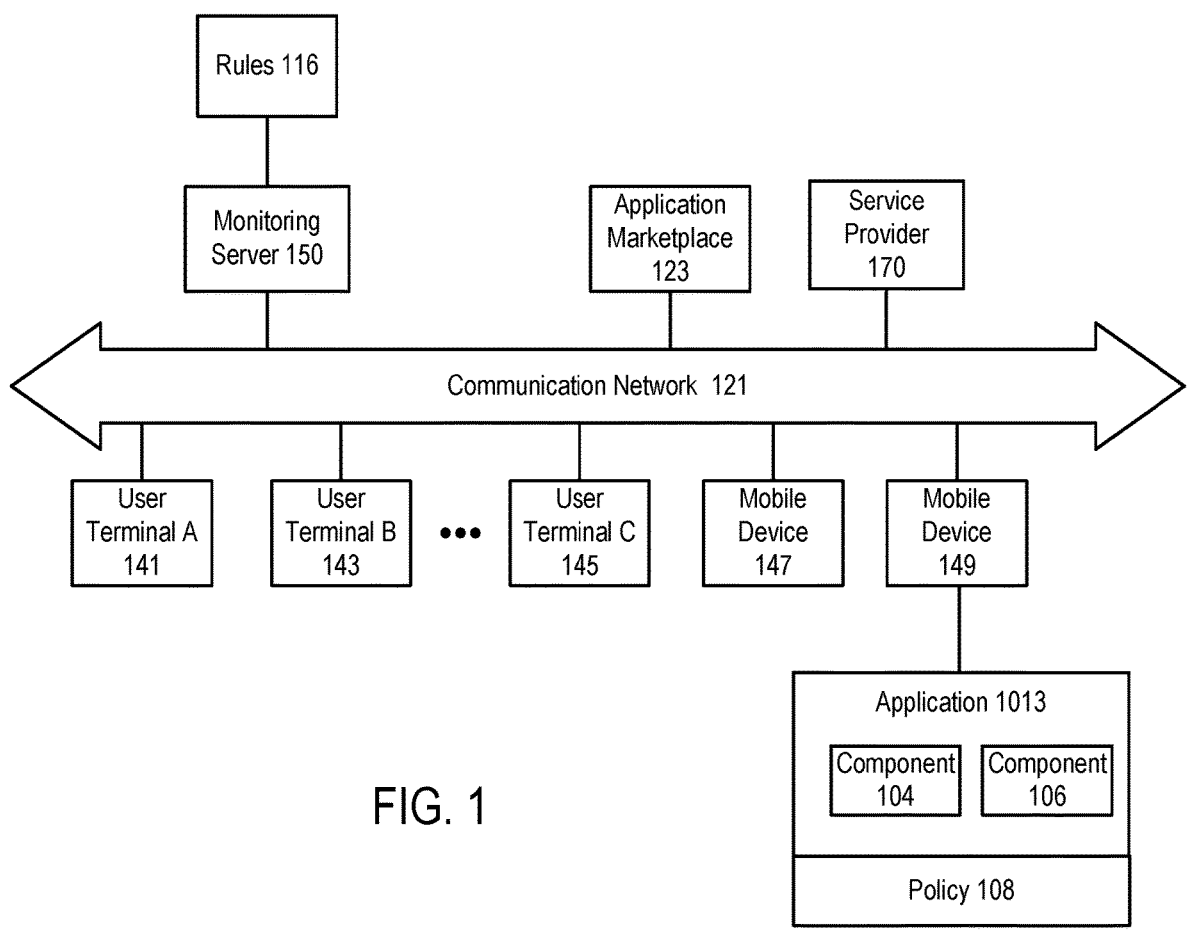
FIG. 1 shows a system for determining whether a computing device is in compliance with one or more rules associated with the context in which the computing device is operating, according to one embodiment.

Various embodiments related to monitoring security of a client device to provide the client device with continuous conditional access to a server are now described below. The generality of the following description is not limited by the various embodiments previously described above.

In prior approaches, protected resources within an enterprise have been hosted and managed by IT administrators within the enterprise. Thus, these resources are only accessible through the internal network or through virtual private networks (VPNs) by authorized users. However, due to the proliferation of SaaS and cloud-based solutions, mobile phones, and BYOD (Bring Your Own Device), creating a strong network perimeter to defend an enterprise's data is no longer feasible. Although certain solutions exist such as MDM, MAM, and app containerization, etc., these solutions cause technical problems by either reducing privacy on an employee's mobile device and/or requiring tight, difficult integration with third-party identity providers or SaaS applications.

Various embodiments of the present disclosure discussed below provide one or more technological solutions to the above technical problems. In various embodiments, an identity broker is used to continuously monitor security for a client device. In one embodiment, the security is assessed prior to granting access to the service. After access has been granted, the security of the client device is monitored in real-time as long as the client device has access to the service. If a risk is identified, the client device is denied access, or its access is revoked.

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

At least some embodiments below relate to software component substitution, modification, and/or other actions that are performed when a determination has been made that a computing device is operating in a way that violates one or more rules associated with a current context in which the computing device is operating.

As an example of a violation, consider a mobile phone located in the United States that uses strong encryption and is operating in compliance with security regulations of the United States. However, the same encryption when performed by the mobile phone in China may be operating in violation of the security regulations of China. This may occur, for example, if a person travels by plane from the United States to China, but no changes in the configuration of the person's phone are made. The risk of a violation is particularly higher if no changes are made to encryption software on the phone. This creates the technical problem of needing to configure the mobile phone as a person travels. Often, this is difficult to implement. Further, the user of the phone often is not aware of changing regulations, and/or is not able to anticipate future countries or other regions of travel. Further, the user is not able to track numerous security regulations or other rules around the world.

In one example, the provider of WhatsApp software has announced that it has implemented end-to-end encryption. It is expected that various governments around the world will require the provider of WhatsApp software to provide a back door, or a less robust form of encryption when the WhatsApp software is used within the territory of the respective government (e.g., China or Russia). In this scenario, a technical problem exists in that content was encrypted with a stronger encryption in a first territory, but now the user carries the device into a second territory, which requires a weaker encryption. The problems include uncertainty whether the user will be properly aware of or notified about the need for a software change (or other device re-configuration) to weaker encryption. The problems also include uncertainty about whether the device should behave differently when it detects that it has moved from the first territory to the second territory.

Various embodiments of the present disclosure discussed below provide one or more technological solutions to the above technical problems. In one embodiment, depending on the location of a device (e.g., the device's geographic location), an application or other software component on the device is dynamically substituted or modified to be compliant with local regulatory requirements (e.g., requirements regarding cryptography and/or privacy, etc.). In one example, a first security portion of the application is switched for a second security portion using weaker encryption.

In one embodiment, upon detection of movement of a mobile communications device into a new territory that requires, for example, weaker encryption and/or a backdoor, one or more actions are performed. For example, the detection could occur based on pre-existing knowledge stored in the device (e.g., the device itself determines it has entered the new territory). For example, the device can receive a message (e.g., from a monitoring server) that indicates the device has entered the new territory.

In various embodiments, the actions performed can include one or more of the following:

Notify the user of the mobile communications device about the new condition or situation (e.g., presence of the mobile device in a new territory that requires different operational configuration of the mobile device due to regulations, and/or network policies, etc.).

Implement a policy resident on the mobile communications device to replace a component of an application. For example, substitute the encryption and decryption module(s) on the device. These substitute modules may have been pre-programmed and already be resident on the device, or can be received from a network in response to determining the new condition or situation (e.g., a violation by the device when operating in a new context).

Re-encrypt content associated with an application according to a new standard associated with the present context of the device. In one example, data stored with strong encryption is decrypted and re-encrypted to a weaker encryption standard. In another example, traffic can be blocked entirely at an illegal encryption level based on the geographic location of the mobile device.

Replace a component of an application. For example, substitute the encryption and decryption modules. For example, this can be done without reference to a policy resident on the mobile communications device. For example, the substitution can be done even if it is inconsistent with a user-specified preference or policy on the device if necessary to comply with local security-related regulations of a country. These substitute modules may have been pre-programmed on the device, or can be received from a network on real-time demand for their need.

For third-party applications that incorporate a security SDK functionality, inform the developer of the third-party application about the potential or actual substitution of an SDK security component (e.g., to be performed in response to determining a violation of regulations of a new territory in which the device is operating or present). In one example, as an option, wait for authorization from the third-party application (or a server of the developer) prior to substituting the component.

Replace a component of an application to substitute encryption or decryption modules, and/or redirect received traffic to a security server. For example, if a first user is using application A on her mobile device in country A and the security policy associated with country A does not permit the encryption level at which application A is operating, then a component on application A can be replaced to meet the country A's legal encryption level. However, the first user could send data to a second user who is in country B where he is using application A without the replaced component. The application A on the second user's mobile device may not allow the second user to receive data below the standard encryption level for application A. The replacement component of application A can be configured to transmit the outbound data to a security server which can be encrypt the data sent from modified application A to unmodified application A, then send the encrypted data to unmodified application A. The replacement component of application A can also require that data sent to the modified application A first be decrypted (or decrypted, then encrypted according to the security policy) before being sent to the modified application A. In at least one embodiment, the security server can decrypt and/or encrypt data according to different security policies associated with two or more applications modified according to the different security policies.

The embodiments set forth herein can be implemented using a wide variety of different types of computing devices. As used herein, examples of a "computing device" include, but are not limited to, a server, a centralized computing platform, a system of multiple computing processors and/or components, a mobile device, a user terminal, a vehicle, a personal communications device, a wearable digital device, an electronic kiosk, a general purpose computer, an electronic document reader, a tablet, a laptop computer, a smartphone, a digital camera, a residential domestic appliance, a television, or a digital music player. Additional examples of computing devices include devices that are part of what is called "the internet of things" (TOT). Such "things" may have occasional interactions with their owners or administrators, who may monitor the things or modify settings on these things. In some cases, such owners or administrators play the role of users with respect to the "thing" devices. In some examples, the primary mobile device (e.g., an Apple iPhone) of a user may be an administrator server with respect to a paired "thing" device that is worn by the user (e.g., an Apple watch).

FIG. 1 shows a system for determining whether a computing device is in compliance with one or more rules 116 associated with the context in which the computing device is operating, according to one embodiment. For example, the computing device is a user terminal or a mobile device.

In FIG. 1, user terminals (e.g., 141, 143, . . . , 145) and/or mobile devices (e.g., 147, 149) are used to access, communicate, and/or interact with monitoring server 150, application marketplace 123 (e.g., an Android or Google Play store or marketplace, or an enterprise application store), and/or a service provider 170 over a communication network 121 (e.g., the Internet, a wide area network, a local network, or other wired or wireless communications network). Network 121 may be used to download and remotely install applications selected from marketplace 123 (e.g., using Google Play or the Android Market). Marketplace 123 may include one or more web servers (or other types of data communication servers) to communicate with the user terminals (e.g., 141, 143, . . . , 145) and mobile devices 147, 149. Each of these applications may initiate or originate an access request for a service provided by service provider 170.

Specifically, mobile device 149 may download a new application 1013 from application marketplace 123, service provider 170, or a developer server (not shown). In one embodiment, an application obtained from the developer server is signed using a signing certificate. In one embodiment, the application obtained from the application marketplace 123 is signed using a signing certificate (e.g., using the same signing certificate used by the developer server).

New application 1013 has components 104 and 106. Application 1013 may generate an access request (e.g., for access to a service provided by service provider 170) that is transmitted to a server (e.g., transmitted using a series of computing devices originating with mobile device 149). In one embodiment, the access request is sent by mobile device 149 to monitoring server 150, which forwards a communication regarding the request to service provider 170.

In one embodiment, component 104 is a software component (e.g., a security component, or security software 2207 of FIG. 2 below) that generates or obtains data regarding a risk configuration of a computing device (e.g., a risk configuration of mobile device 149, on which a user initiates a request for access). For example, a user action in a user interface displayed on mobile device 149 causes component 104 to initiate an access request for a service provided by a computing device of service provider 170. The access request is transmitted to monitoring server 150, which can perform a security evaluation of a configuration of mobile device 149 based on various factors (e.g., as part of determining a context of mobile device 149 operation).

Mobile device 149 stores a user policy 108. The new application 1013 may be compared to user policy 108 during or after installation. In one example, monitoring server 150 includes a data repository of policies as rules 116 (e.g., user policies required by an admin server). User policy 108 of mobile device 149 may be compared to policies 116. An administrator server (not shown) may provide some policies in policies 116 (e.g., as regards usage of or installation of applications onto mobile device 149). In one embodiment, it is determined that user policy 108 is not in compliance with the current state of rules 116 when applied to the currently-determined context of the mobile device 149.

The user policy 108 is stored locally in a memory of mobile device 149. In one embodiment, during operation, user policy 108 may be used to define the handling of components 104 and 106 on mobile device 149. In one embodiment, a user policy for mobile device 149 may alternatively (or in addition to user policy 108) be stored as one of policies 116 on the monitoring server 150 and/or an identity provider (not shown). A user or administrator policy may be enforced on mobile device 149 using either a local user policy or a remote user policy, or a combination thereof. In at least one embodiment, the policy can include instructions to perform steps if the mobile device or mobile device security component is not connected to the server security component or the server. An administrator can define and deploy policies for an organization. In some embodiments, the organization may be a family or other social group, and the administrator role may be performed by a parent or guardian, or may be performed by a third party service provider. Such a third party service provider may be a provider of security services, the network operator, and/or a provider of content services. The additional levels of protection and control that organizations such as enterprises desire can also be advantageous for consumers, but consumers are typically not knowledgeable enough to perform administrator roles. Thus, there is often a need for third party service providers to act as technically-oriented admins. The consumer or parent or guardian as an admin may specify preferences corresponding to high-level policy decisions, and a technical admin can configure underlying services to meet these high-level policy decisions. An administrator or admin as used in this disclosure includes, but is not limited to, all such administrators (e.g., technical admin, consumer, parent, guardian, service provider, etc.) as described in this paragraph.

In one example, a component is a part of an application (e.g., an application that is installed by a user from an Android or other software application marketplace and then executes on a mobile device). In one example, a component is provided by the application's creator or by a third party. In another example, the component may be code provided by an ad network or an analytics network.

In one example, applications installed on a mobile device are monitored. Applications that encrypt data can be identified, along with a level of encryption that is used by each application. This identification and corresponding level is stored for each application. This information can also be updated when a new application is installed, and/or when an application update is applied. For example, at a later time, this stored information can be used to determine which of the installed applications are affected by one or more security policies that currently apply (e.g., a security policy that applies for the current device location).

In yet another example, components are linked libraries/SDKs that are packaged within an application. This is code that is within the application, but the code is developed by a third party and provides the ability for an application developer to integrate certain behaviors of that component into the developer's application (e.g., displaying a certain type of ads from a certain ad network such as LeadBolt). In one example, monitoring of context and/or substitution or modification of components based on such monitoring as described herein is integrated as a security component into a developer's or other entity's application. In another example, a set of data (e.g., in a file or a database) that is used by an application may be considered as a component of that application. Also, in some examples, data used by an application can be considered as known or unknown, or trusted or untrusted.

In one embodiment, a user policy (e.g., user policy 108) based on component behavior may be enforced on the user's computing device. For example, the user policy may require that there be no applications that send location to an advertising network. In another example, the user policy may require that no applications send identifiers to an advertising network. In one embodiment, it is determined that the context of the computing device is associated with rules 116. It is further determined that one or more actions authorized and/or permissions granted by the computing device, such as under the user policy, are inconsistent with the rules 116 associated with the present context of the computing device.

In one embodiment, monitoring server 150 monitors the context in which one or more computing devices is operating. For example, monitoring server 150 determines a context in which user terminal 141 and/or mobile device 149 is operating.

In at least one embodiment, security software (e.g., security software 2207 or security component 1412) dynamically monitors a context of a mobile device. For example, the context can include the location of the mobile device, the current level of permitted encryption, and/or the corresponding legal level of encryption required for the current location of the mobile device.

In one embodiment, in response to determining that the mobile device is operating above or below the legal encryption level associated with the location, the encryption level of the mobile device is adjusted to operate in accordance to an encryption policy for the current location. In various examples, the location can include a country, a state, a building, physical premises associated with an organization, a network, etc.

In one example, an enterprise may require all network communication from devices connected to its network to be encrypted. In this example, the context of the user mobile device can be identified as being connected to the enterprise network, and the security policy associated with the device (e.g., the security policy currently implemented for applications installed on the device) can be compared to the security policy of the enterprise.

After determining the context in which, for example, mobile device 149 is operating, monitoring server 150 determines one or more rules 116 associated with the context. For example, monitoring server 150 determines a geographic location of mobile device 149. This location is used to determine rules 116 that are applicable to operation of mobile device 149 for that determined location.

In another example, monitoring server 150 determines a network to which mobile device 149 is connected or accessing. Based on the determined network, monitoring server 150 determines rules 116 that are applicable to usage of the network. For example, rules 116 that apply to the network may be one or more policies associated with use of the service provided by the network. In one example, the policies are provided by service provider 170. In one example, the policies are provided by an enterprise that manages mobile device 149, which is used by, for example, an employee of the enterprise.

After determining the rules applicable to the present context of the mobile device 149, monitoring server 150 determines whether the computing device is in compliance with the applicable rules. For example, the rules applicable to the present context may include requirements regarding security processing on the mobile device 149. Monitoring server 150 may determine, for example, that encryption and decryption modules on mobile device 149 do not comply with applicable requirements regarding security processing.

In response to determining that the computing device is in violation of one or more applicable rules above, monitoring server 150 performs one or more actions. In one example, the actions include one or more actions as described above for the detection of movement of a mobile communications device into a new territory.

In one embodiment, the actions performed by monitoring server 150 include modifying or substitute a component of software on mobile device 149. For example, component 106 on application 1013 can be substituted for a new component. The new component can be sent from monitoring server 150 to mobile device 149, or may already be present on mobile device 149. In one embodiment, the new component can be sent from another computing device, such as service provider 170, or from a developer server.

In one embodiment, the new component to be used for substitution is selected from a set of software components. The new component is selected at least based on its being compliant with the applicable rules to the present context. For example, the new component can be selected based on the geographic location, which corresponds to the applicable rules for the present context.

In one embodiment, the actions performed by monitoring server 150 include sending a communication to mobile device 149 to cause a display of a warning to the user. In one example, the warning indicates that security software on the mobile device 149 is in violation of regulations for the territory in which the mobile device is currently operating.

In one embodiment, mobile device 149 itself makes a determination of the applicable rules for the current context of operation. For example, mobile device 149 can store a table including geographic locations and corresponding rules that are applicable when the mobile device is in the geographic location. Mobile device 149 can perform actions in response to determining a violation using this table without requiring communication with monitoring server 150. In another embodiment, mobile device 149 communicates with monitoring server 150 after determining the violation.

In one embodiment, monitoring server 150 determines that mobile device 149 is lost or stolen. In one embodiment, this determination is made in response to determining a context in which mobile device 149 is operating. For example, it may be determined that the context is inconsistent with usage by the authorized user. For example, the context may indicate that the mobile device 149 is lost or stolen. In one example, the user sends a communication to monitoring server 150 to report that the mobile device 149 is lost or stolen.

In one embodiment, in response to determining that the mobile device is lost or stolen, one or more actions are performed. For example, monitoring server 150 can reduce service to the mobile device, deny service to the mobile device, and/or require authentication by the mobile device. The authentication required can be more stringent than normally required of the authorized user.

In one embodiment, if monitoring server 150 authorizes access to a service by mobile device 149, server 150 sends a communication over network 121 to service provider 170 regarding authorizing access to the service. In one embodiment, server 150 determines a risk level for mobile device 149 and includes this risk level in the communication to service provider 170. In one embodiment, determining the risk level is part of determining the context of operation for mobile device 149.

In one embodiment, when component 104 makes a request for access to the service, the request is first sent to service provider 170. Then, service provider 170 forwards the access request to monitoring server 150. Monitoring server 150 performs a security evaluation of risk factors associated with mobile device 149. In one embodiment, the risk factors are used to determine the context of the mobile device 149. If the evaluation determines that the configuration is not secure and/or that mobile device 149 is currently operating in violation of one or more rules 116, server 150 blocks access by mobile device 149 to the service.

In one embodiment, the security evaluation is based on data received from the mobile device 149. At least a portion of this data can be sent to service provider 170 along with a result of the security evaluation. In one embodiment, this data is received from component 104, or from another software component such as component 106 that is on mobile device 149. The data sent to monitoring server 150 is obtained from the mobile device using this software component.

In one embodiment, the security evaluation by server 150 includes determining a source of application 1013, component 104, and/or component 106. In one embodiment, the security evaluation includes evaluating authenticity of software on mobile device 149 and/or analyzing at least one component installed or otherwise stored on mobile device 149.

In one embodiment, the security evaluation determines an extent of security risk for mobile device 149 based on a plurality of factors. The extent of access to the service provided to mobile device 149 is based on this extent of security risk.

In one embodiment, the security evaluation determines that a risk configuration of mobile device 149 passes a security threshold. If the threshold is passed, server 150 sends a communication to service provider 170 regarding the passed security threshold. This communication may include data obtained from mobile device 149 and used in the security evaluation above.

In one embodiment, a token is generated for mobile device 149. This token includes data that encodes a risk level determined from the security evaluation. The token is provided to mobile device 149 by monitoring server 150 or another computing device such as service provider 170. The risk level and/or data obtained and used in the security evaluation is provided to service provider 170 to configure the service provided to mobile device 149. In one embodiment, service provider 170 uses the risk level and/or data from the security evaluation to determine a risk state associated with providing the service to mobile device 149.

The service may be dynamically reconfigured periodically and/or in real-time as subsequent security evaluations are performed for mobile device 149. Also, if the risk state fails a threshold determination, then the user of mobile device 149 may be alerted by a display or other communication on mobile device 149 that the service is blocked. In addition, the user may be requested to take remedial action using mobile device 149 and/or another computing device of the user.

In one embodiment, if it is determined by monitoring server 150 in a security evaluation or as part of a context determination, performed after a user has started receiving a service, that a risk level associated with mobile device 149 exceeds a threshold or is otherwise un-trusted, then an open session of the user with the service from service provider 170 can be closed. Also, any token of mobile device 149 indicating a healthy or safe configuration of the device can be revoked or destroyed. This prevents further access to the service by the device. In one embodiment, if access to a service is terminated as just described, an identity provider can be notified of the change by monitoring server 150. Also, a level of access to the service can be decreased based on the newly-determined risk level, instead of terminating all access to the service.

In one embodiment, if it is determined by monitoring server 150 that mobile device 149 is not configured correctly or adequately for a present context as determined by a risk level, various actions may be taken. For example, mobile device 149 may be instructed to take a photo that is uploaded to server 150, acquire a device location and upload to server 150, and/or erase sensitive data on mobile device 149. Other examples include disabling login credentials, instructing the user how to remediate the problem, allowing login by the user, but denying access to certain services, revoking a token already in use by the device, and/or changing a password for the service.

In one embodiment, data used in a context determination or security evaluation by monitoring server 150 is extracted from one or more communications received from mobile device 149, and/or from service provider 170. In some cases, such communication can be the communication that includes the access request. In other cases, the communication is received prior to or subsequent to receiving the access request.

In one embodiment, the access request is generated by application 1013, which is executing on mobile device 149. Performing the security evaluation includes determining the authenticity of application 1013, for example as discussed below.

In one embodiment, the security evaluation can include assessing a context of a user of mobile device 149. This context can be determined by various factors including a location of mobile device 149, a device location for at least one prior login made by the user (e.g., a prior login to the service), an event associated with the presence of the user on a computing device other than mobile device 149 (e.g., this other device may be a tablet, a laptop, or a watch device of the user), or credentials associated with the user that have become unsecure (e.g., credentials that have been identified from monitoring of the dark web).

In one embodiment, mobile device 149 is associated with a domain. Monitoring server 150 performs an evaluation using data from one or more prior communications received by monitoring server 150. These prior communications may be provided from other computing devices associated with the domain.

In one embodiment, access to the service from service provider 170 requires that a software component is installed on mobile device 149. In response to determining that the software component is not installed, the communication is sent to the mobile device requesting installation of the software component. After sending this communication, monitoring server 150 determines whether the software component is properly installed on mobile device 149. If so, server 150 sends a communication to cause service provider 170 or an identity provider to authorize or grant access to the service.

In various embodiments, access to a service provided by service provider 170 is conditioned on a successful evaluation of various risk-based factors. Mechanisms that may be used to authenticate a device, user, and/or application by monitoring server 150 include one or more of the following: requiring that an SSL client certificate be supplied for each access request by mobile device 149, evaluating authentication factors provided from network connection establishment (e.g., Wi-Fi, VPN, cellular, etc.) by mobile device 149, or evaluating authentication factors provided from establishment of a network tunnel or proxy connection for mobile device 149. In at least one embodiment, when a mobile device attempts to access a SaaS server, the SaaS server can receive and/or request a certificate associated with the mobile device. In an example, if no certificate associated with the mobile device, the mobile device can be configured to contact the certificate provisioning service to request a certificate. In another example, if no certificate associated with the mobile device, the SaaS service can instruct the mobile device to contact the certificate provisioning service to request a certificate. In some embodiments, a mechanism may be used to authenticate a device and a user of the device by authenticating via an identity provider in conjunction with a security component coupled to a monitoring server 150 including one or more of the following: requiring that an SSL client certificate be supplied for each access request by mobile device 149, evaluating authentication factors provided from network connection establishment (e.g., Wi-Fi, VPN, cellular, etc.) by mobile device 149, or evaluating authentication factors provided from establishment of a network tunnel or proxy connection for mobile device 149.

In various embodiments, factors used in a context determination or a security evaluation by monitoring server 150 to allow or deny access to a service are now described below:

1. Various device factors associated with mobile device 149 include determining whether the device is compromised, such as whether an operating system is compromised, whether the device is up-to-date, such as whether a vulnerable operating system version is in use. Further factors include determining a presence of malware, or determining whether the device has a secure configuration. For example, determining whether a bad SSL root identified for certificate authorities is installed on the device, an anomalous VPN/proxy is identified, whether device encryption enabled, and/or whether a pin code is enabled. Further factors include evaluating hardware-backed authentication associated with mobile device 149. For example, determining whether a device key is stored in a secure enclave, or whether a server provides a nonce which mobile device 149 signs with hardware to prove presence of hardware-stored key.

2. Various user factors may be used in the security evaluation. These factors may include biometric factors such as a fingerprint, or knowledge-based factors such as whether a user of mobile device 149 is able to answer knowledge-based questions (e.g., about the user's background or prior life or work activities).

3. Various application factors may be used in the security evaluation. These factors may include determining whether application 1013 on mobile device 149 is an authorized or allowed version of the application. For example, whether the application is the official enterprise application or an unofficial version. Also, these factors include determining whether the application is up-to-date, such as whether there is a known vulnerability in this particular application.

4. Various context factors may be used in the security evaluation. These factors may include determining a location of device 149, other recent user logins and respective devices/locations associated with these logins, and/or other user-present events (e.g., a badge in, CCTV facial recognition, Wi-Fi connections, and Bluetooth beacon detections).

In one embodiment, monitoring server 150 collects data from the device and sends the data to a cloud back-end server system accessible to server 150 in order to compare the collected data to other data that monitoring server 150 has collected. Types of data collected include, for example, an application inventory of all apps installed on the device, version numbers for the apps, and what are the hashes and unique identifiers associated with those applications. Monitoring server 150 fingerprints the filesystem of the device (e.g., firmware, etc.) and calculates a fingerprint for the device so monitoring server 150 can determine when a device is running modified firmware or other (improperly) modified software. In at least one embodiment, in response to a connection request to a SaaS server, the mobile device can be directed to an identity broker. The identity broker can verify that the mobile device is associated with a certificate which permits the mobile device to access one or more applications (i.e., microservice) on the SaaS server. The communication between the mobile device and the identity broker can cause a record to be created of indicating a connection between the mobile device and one or more applications associated with the SaaS server. In at least one embodiment, the record can be stored in a connection records database. In an embodiment, responsive to the confirmation by the identity broker that the mobile device is associated with a certificate, the mobile device can be permitted to access one or more applications associated with the SaaS server. In an embodiment, responsive to the confirmation by the identity broker that the mobile device is associated with a certificate, a request can be sent to the mobile device requesting user authentication. In an embodiment, responsive to the confirmation by the identity broker that the mobile device is associated with a certificate, the enterprise security policies can be used to determine whether to permit access by the mobile device or whether additional information is required before permitting access.

In one embodiment, monitoring server 150 collects information regarding how the network is behaving (e.g., the network communication path between monitoring server 150 and mobile device 149, or communications by mobile device 149 with other computing devices). For example, monitoring server 150 runs a series of behavioral tests on each network to which mobile device 149 connects (e.g., whether the device is sending potentially hack-able communications to random or unknown servers; whether there been any attempt to downgrade the TLS or other secure version of protocol being used for communication; and/or whether the certificates that the device is receiving from these requests are valid, etc.).

In one embodiment, at least a portion of data associated with the security evaluation by monitoring server 150 is sent to service provider 170. The service provider can configure a policy regarding the type of data that is sent by monitoring server 150 (e.g., using a console provided to the service provider by monitoring server 150). Use of this policy can group the device based on the evaluated data into a risk class (e.g., high-risk or low-risk). Monitoring server 150 only communicates to service provider 170 the class of risk based on the previously-determined or configured policy (e.g., using the console) of the service provider.

In one embodiment, all of the functions above are provided, but instead of using a separate client application on the device, the attestation functionality is provided via an SDK that controls the active application in the device directly. In other words, a software component is a part of the active application on the device that makes the request for access to the service.

In one embodiment, one or more SDK components are present in an application. Monitoring server 150 determines that the application is in violation of rules 116 based on the context determination. In response, monitoring server 150 causes modification or substitution of the one or more SDK components on mobile device 149.

In one embodiment, the analysis functions performed by the monitoring server 150 can be done via an SDK that is injected into a client application that the user is currently using on the user's device. One example is an identity provider (e.g., Okta has an app that facilitates single sign-on using a user device). The identity provider app can include an SDK that incorporates the security evaluation functionality above so that the app can make risk decisions itself instead of having to consult another application or computing device. In some embodiments, the identity provider can be coupled to a security component that incorporates the security evaluation functionality so that the identity provider can determine to revoke/modify access or receive a request to revoke/modify access based on the risk decisions.

In one embodiment, a use case is a business-to-consumer use case. For example, a bank can decide that before customers are permitted to login to a banking application, or attempt to initiate a large balance transfer, the monitoring server checks the risk level of the device. The bank can require that the user install an application that incorporates or uses the security evaluation discussed above.

In one embodiment, there are cases where the monitoring server determines that a device should not be trusted without first requiring installation of a client application on the device. For example, based on headers received by the monitoring server, it is determined that the device is running an older operating system that is deemed as being unacceptably old. So, a security evaluation does not necessarily require consulting a client application on the user device. There are cases where the monitoring server can make a decision not to trust the device (e.g., solely from a SAML request) even though no client application is on the device. In at least one embodiment, the TLS handshake is established prior to the authentication request and the certificate is mapped to a unique device identifier, if the handshake fails that can mean that the device does not have a client certificate or has a revoked one therefore the device is out of compliance.

In at least one embodiment, a security event can be identified in association with the mobile device. The security event can include a device compromise such as a man in the middle (MITM) attack, evidence of the mobile device being rooted, and/or other security breach. Responsive to a security event being identified in association with the mobile device, a record in a connection records database can be identified to determine whether the mobile device is connected to one or more applications associated with a SaaS server. In response to a record being identified in the connection records database, the SaaS server, services associated with the mobile device, and/or mobile device can be notified to revoke access between the mobile device, and the one or more applications associated with the SaaS server. In another embodiment, response to a record being identified in the connection records database, the mobile device access to the SaaS service can be revoked. In one embodiment, response to a record being identified in the connection records database, the mobile device access to one or more enterprise applications associated with one or more SaaS services can be revoked. Responsive to a security event being identified in association with the mobile device, the mobile device access to one or more enterprise applications associated with one or more SaaS services can be revoked.

In one embodiment, a user of mobile device 149 is attempting to log into a service at the domain service.com provided by service provider 170. The user enters her username and password. Based on the user entering her e-mail address or the domain name of the e-mail address, service provider 170 redirects this access request to an identity provider (e.g., an identity sign-on provider such as the Okta service). The user then provides her username and password to the identity provider. In one example, this communication occurs over protocols like SAML 2.0 (Security Assertion Markup Language (SAML) is an XML-based data format for exchanging authentication and authorization data). In one embodiment, SAML chaining is used with multiple identity providers that all consult each other before a user can log in. The identity broker can be communicatively positioned between the mobile device and an identity provider. In at least one embodiment, the identity provider is communicatively coupled to a security component.

In one embodiment, the service request to service.com is made by an application on mobile device 149 that is associated with service.com. This application is configured to communicate with monitoring server 150 when an access request is made to the service.com domain. Monitoring server 150 is configured to communicate with the identity provider if server 150 determines that the device is in a secure state. In at least one embodiment, the monitoring server 150 is configured to communicate with the identity provider if server 150 can determine that the device is not in a secure state or is unidentifiable. If server 150 determines that the device is insecure, server 150 can request that the user remediate any issue identified. In an embodiment the monitoring server is a service stored on the mobile device. In at least one embodiment the monitoring service is stored externally of the mobile device, and/or in the cloud. In at least one embodiment, the monitoring server can be communicatively connected to an identity broker which serves as an intermediary between the mobile device, the service, and the identity provider. When a monitoring server and/or the security competent identifies a security state change of the mobile device, the identity broker can be notified and in response the notification the identity broker can revoke the connection between the mobile device and the service provider.

In one embodiment, monitoring server 150 checks that a device is free of threats and is compliant with a corporate policy corresponding to service provider 170. Regarding vulnerabilities and this policy, these can be configured by service provider 170 based on the service provider's desired risk threshold. For example, for the risk of an operating system version that is too old, the service provider sets the policy as to whether the service provider wants to prevent access to that device. In other cases, regarding behavior and configuration, a determination can be made whether the application running on the device is compliant with policy, whether the way that the device is configured is compliant with policy, whether there is a passcode set, etc.

In one embodiment, the level of risk as determined by the security evaluation leads to access to some services, but not to other services. For example, access to some resources may be permitted, but not to other resources (e.g., resources required to send money). The determined level of risk is used to set the level of access provided to the service.

Figure 2:
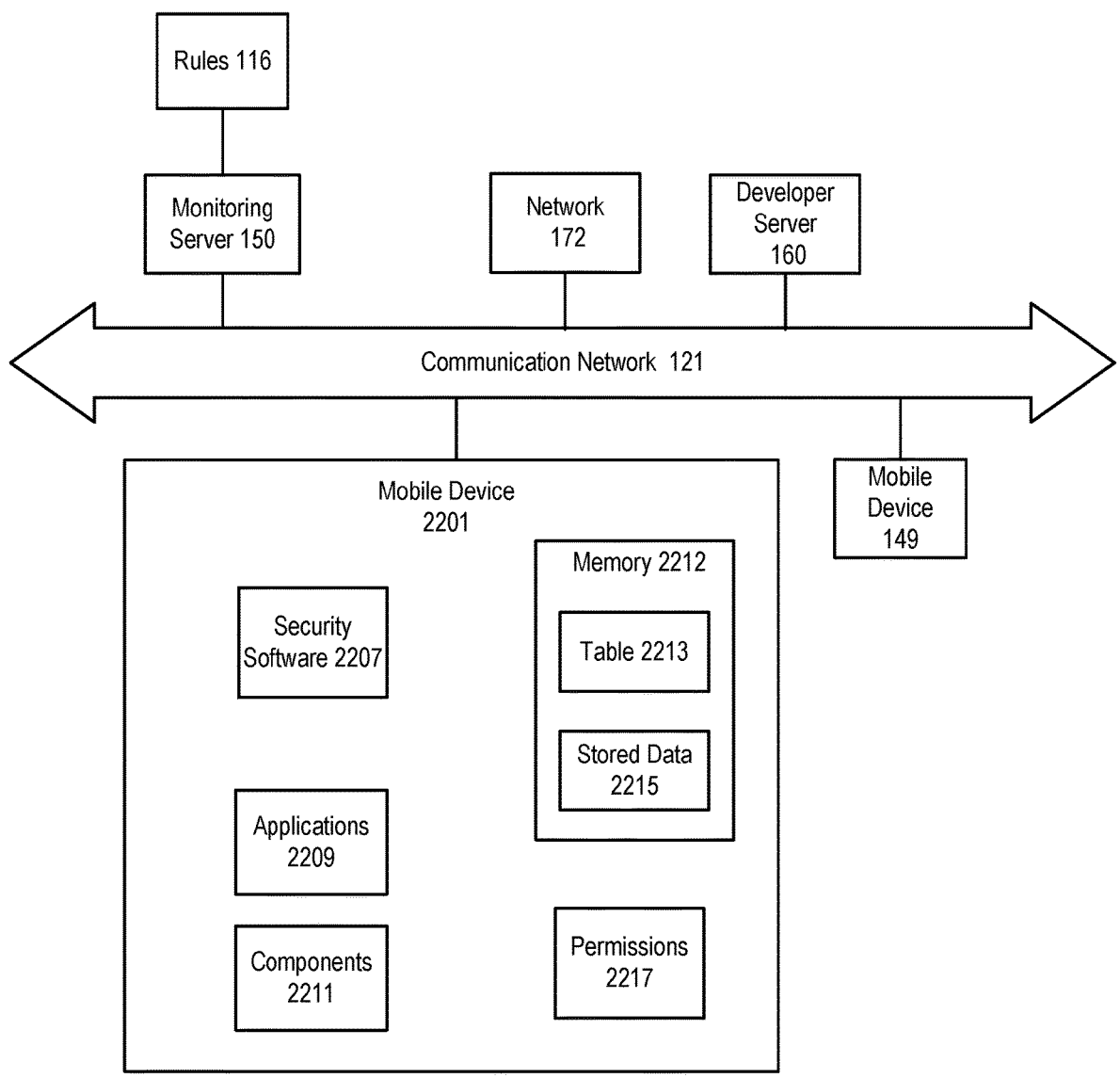
FIG. 2 shows a system for determining a context in which a computing device is operating using a monitoring server, according to one embodiment.

FIG. 2 shows a system for determining a context in which a computing device is operating using monitoring server 150, according to one embodiment. For example, monitoring server 150 determines a context for mobile device 2201, similarly as discussed above for mobile device 149.

In one embodiment, mobile device 2201 accesses network 172 over communication network 121. For example, mobile device 2201 accesses a service provided via network 172. In one embodiment, an application on mobile device 2201 is obtained from developer server 160. In one example, the application includes an SDK component related to security, which is modified or substituted in response to determining a violation associated with the context of mobile device 2201.

Mobile device 2201 includes memory 2212 that stores a table 2213 and/or stored data 2215. Table 2213 includes a list of geographic locations and corresponding rules associated with each location.

Stored data 2215 may have been previously stored using a strong encryption. In response to determining that mobile device 2201 is in violation of one or more rules of table 2213, stored data 2215 is decrypted and then re-encrypted using a weaker security encryption process.

Mobile device 2201 includes security software 2207. For example, security software 2207 communicates with monitoring server 150. Security software 2207 collects data from one or more sensors of mobile device 2201 as part of determining a context. One or more of the sensors can be related to determining a geographic location of mobile device 2201. In some embodiments, the monitoring server can be a security component.

Security software 2207 also may determine one or more permissions 2217 that have been configured on mobile device 2201, such as by the user. Security software 2207 reports one or more of these permissions 2217 to monitoring server 150.

Mobile or client device 2201 includes applications 2209 and components 2211. Applications 2209 are an example of application 1013. Components 2211 are an example of components 104 or 106. Components 2211 can be stored on mobile device 2201 for use in future modification or substitution into or with one or more applications 2209. For example, a component 2211 can be used to substitute a component of an application 2209 in response to determining that mobile device 2201 is in violation of a rule 116 and/or a rule in table 2213.

In some embodiments, the manner of usage and/or behavior of an application on a computing device can be monitored and this can be part of a context determination for the computing device. The usage or behavior of components of the application on the device that are inconsistent with a user or administrator-designated policy can be identified. In such event, the source of the application and/or use of the application can be deemed as untrusted or in violation of a rule 116.

There are various examples of policies that may be used on mobile or other computing devices. For example, a user policy may define the handling of components 104 and 106 on mobile device 149. A policy may be defined by behavioral preferences established by a user and/or an administrator, and this policy is enforced on new applications installed on the mobile device. In another example, a policy may apply to a particular identified application.

In other examples, policies may be defined and applied to control or restrict the behavior of applications and their components. This can include the identification of advertising networks and defining policies to permit various opt-out actions for these advertising networks.

Although FIG. 2 illustrates an exemplary system implemented in client-server architecture, embodiments of the disclosure can be implemented in various alternative architectures. For example, the monitoring server 150 may be implemented via a peer to peer network of user terminals in some embodiments, where applications and data/information from mobile devices are shared via peer to peer communication connections.

In some embodiments, a combination of client server architecture and peer to peer architecture can be used, in which one or more centralized servers may be used to provide some of the information and/or services and the peer to peer network is used to provide other information and/or services. Thus, embodiments of the disclosure are not limited to a particular architecture.

In an embodiment, an enterprise risk level is determined, for sharing security risk information between enterprises by identifying a security response by a first enterprise and then sharing the security response to a second enterprise when a relationship database profile for the first collection indicates the security response may be shared. Methods are also provided for determining whether to allow a request from an originating device where the request may have been initiated by a remote device. In one embodiment, the security risk information is used in the security evaluation performed (e.g., by the monitoring server 150 of FIG. 1 above or by another computing device) in response to the access request above. In one embodiment, data obtained from a mobile communications device is evaluated by the monitoring server 150 of FIG. 1 above to determine if granting the device access to a service presents a security threat.

In one embodiment, aggregated information is used in the security evaluation above. In one embodiment, a method is provided for passing aggregated information, such as source information, along with an access request. In the embodiment, aggregated information may be used to determine whether to allow an attempt to access a resource. The aggregated information may include, for example, user authentication information and source information, and source information may include, for example, information about the state of the initiating and originating computing devices, attributes or identities of applications being used in the access attempt, and similar information from any intermediate ("intervening" or "chained") application or computing device that is part of the access attempt.

The aggregated information may be passed with the access request in a number of ways, including, for example: as SAML security assertion extensions, as additional HTTP headers, or via a separate flow. In a further example, a single sign-on (SSO) provider (or Identity Services Provider) may piggyback the aggregated information onto an access request (or responses), and security components on computing devices in the access request chain may add their contributions to the aggregated information in the SSO information flow.

In one embodiment, responses to an access request other than or in addition to "allow" and "deny" are allowed. For example, if the access request related to running an application on the destination computing device and the associated source information indicted that a computing device in the series was untrusted, security component 6735c may allow the request in a limited fashion (e.g., run with output quarantined), or deny the request and initiate or suggest to the user the uninstallation of the target application.

In one embodiment, a secure platform enables mobile devices, such as a cell phones, smartphones, or PDAs, to have relationships with services or service providers that are controlled by the state of security on each device. In one example, the platform is comprised of a server that receives data from security software (i.e., security component, or component) on a mobile device regarding the device's security state. The platform enables access to a service to be granted, denied, or limited based on the security state of the mobile device. The platform may provide two-way communications between a mobile device and a service so that the platform can enforce access security both from the client to the service and from the service to the client. Furthermore, the platform allows services or service providers to evaluate the security state of a device independently of using the platform to communicate with the device.

In one embodiment, a system provides, by a software component on a computing device (e.g., for components on any one or more devices in a series of devices transmitting an access request, as discussed above), a dynamic assessment of a security state of a computing device (e.g., this assessment may be performed by the monitoring server 150 of FIG. 1 above). Here, the user of a mobile communications device may request access to a service provider. This may be where the user attempts to access a banking service or other network based service using software installed on a handset. This request may be managed by a server, which receives the request from the computing device. The server may access a database or other memory to determine whether it has updated security state information for the device. If not, then, this security state information is obtained from the device. Once obtained, the security state for the device may be assessed. If the security state is acceptable, then the device may have access to the service provider. If the device security state is unacceptable, then access may be limited or denied. The acceptability of a device's security state and the level of access to the mobile communications device may be set, for example, by the service provider. In various embodiments, the access control as described by U.S. Pat. No. 8,087,067 may be used to control access to the service provided by service provider 170 of FIG. 1 above.

The security state can represent the assessment of the security conditions associated with the device such as vulnerabilities or risks found on device and/or in the connections associated with the device. For example, if a device is identified as rooted then the security state can be identified as "not secure." In another example, if a device is connected to a network with a detected MITM then the security state can be identified as "not secure." When a device is identified as having an outdated operating system version, the security state can be set to "moderately secure." When no vulnerabilities or low risk vulnerabilities are identified in association with the device then the device can be identified as having a security state of "secure." In at least one embodiment, the parameters for each security state can be configured by an administrator, or the user of the mobile device. For example, the administrator of enterprise A can configure the parameters for a "not secure" security state to include devices with an out of date operating system, while enterprise B administrator can configure the parameter for a "not secure" security state to not include devices with an out of date operating system and instead associate devices with out of date operating systems with a "moderately secure" security state. In at least one embodiment, the risk level is correlated to the security state. In one example, when the risk level associated with the device is deemed high risk, the security state of the device can be set to "not secure."

In at least one embodiment, more than enterprise policy can be applied to the same mobile device. Multiple policies can be associated with multiple services associated with the same mobile device. For example, the administrator of enterprise A can configure the parameters for a "not secure" security state in association with service A to include devices with an out of date operating system, while enterprise B administrator can configure the parameter for a "not secure" security state in association with service B to not include devices with an out of date operating system and instead associate devices with out of date operating systems with a "moderately secure" security state. Both of security states described in the example above can be associated with the same device which can be used to access both service A and service B.

In at least one embodiment, the parameters for each security state can be configured by an administrator, or the user of the mobile device. In at least one embodiment, the parameters of each security state can be unique to a service, a group of services, a user, or a group of users (i.e., executive staff). For example, the administrator of an enterprise can configure the parameters for a "not secure" security state associated with service A to include devices with an out of date operating system. The same administrator can configure the parameter for a "not secure" security state associated with service B to not include devices with an out of date operating system and instead associate devices with out of date operating systems with a "moderately secure" security state. In at least one embodiment, the risk level is correlated to the security state.

In at least one embodiment the risk level can be associated with multiple policies based on various factors. For example, if a banking service is associated with a "not secure" security state when a mobile device has an out of date operating system, additional policy consideration can be factored to determine security state of the mobile device. For example, a device managed by an MDM can be considered more secure than non-managed devices. Therefore in the example described above, a managed mobile device with an out of date operating system can be identified as having a "moderately secure" security state.

In at least one embodiment when a mobile device is determined to be below a threshold security state level, the mobile device can be provided with an option to improve the security state. For example, if a device with an out of date operating system is determined as having a "not secure" security state, instruction or automated steps can be provided to remedy the issue and improve the security state.

In one embodiment, the security evaluation performed above (e.g., by the monitoring server 150 of FIG. 1 above) is a security assessment. This security assessment is displayed in various formats on the mobile device display or on a client computer. A security component identifies security events on the mobile device that are processed on the mobile device or by a server. The security component then determines a security assessment for the mobile device based upon the detected security events. The security assessment display may be persistent in the form of a desktop widget or dashboard on a client computer, or home-screen item on the mobile device. This allows a user or administrator to verify that security protection on the device is functioning and to be alerted if the device needs attention without having to specifically seek the information, thereby enabling immediate response to potential security problems.

In one embodiment, a method evaluates security during an interactive service operation by a mobile communications device and includes launching, by a mobile communications device, an interactive service configured to access a server over a network during an interactive service operation, and generating a security evaluation based on a plurality of trust factors related to a current state of the mobile communications device, to a security feature of the application, and/or to a security feature of the network. When the security evaluation is generated, an action is performed based on the security evaluation. In one embodiment, the monitoring server 150 above performs an evaluation, including use of a threshold as described therein. In one embodiment, these plurality of trust factors are included in the first data above received by the monitoring server 150 for use in the evaluation.

Figure 3:
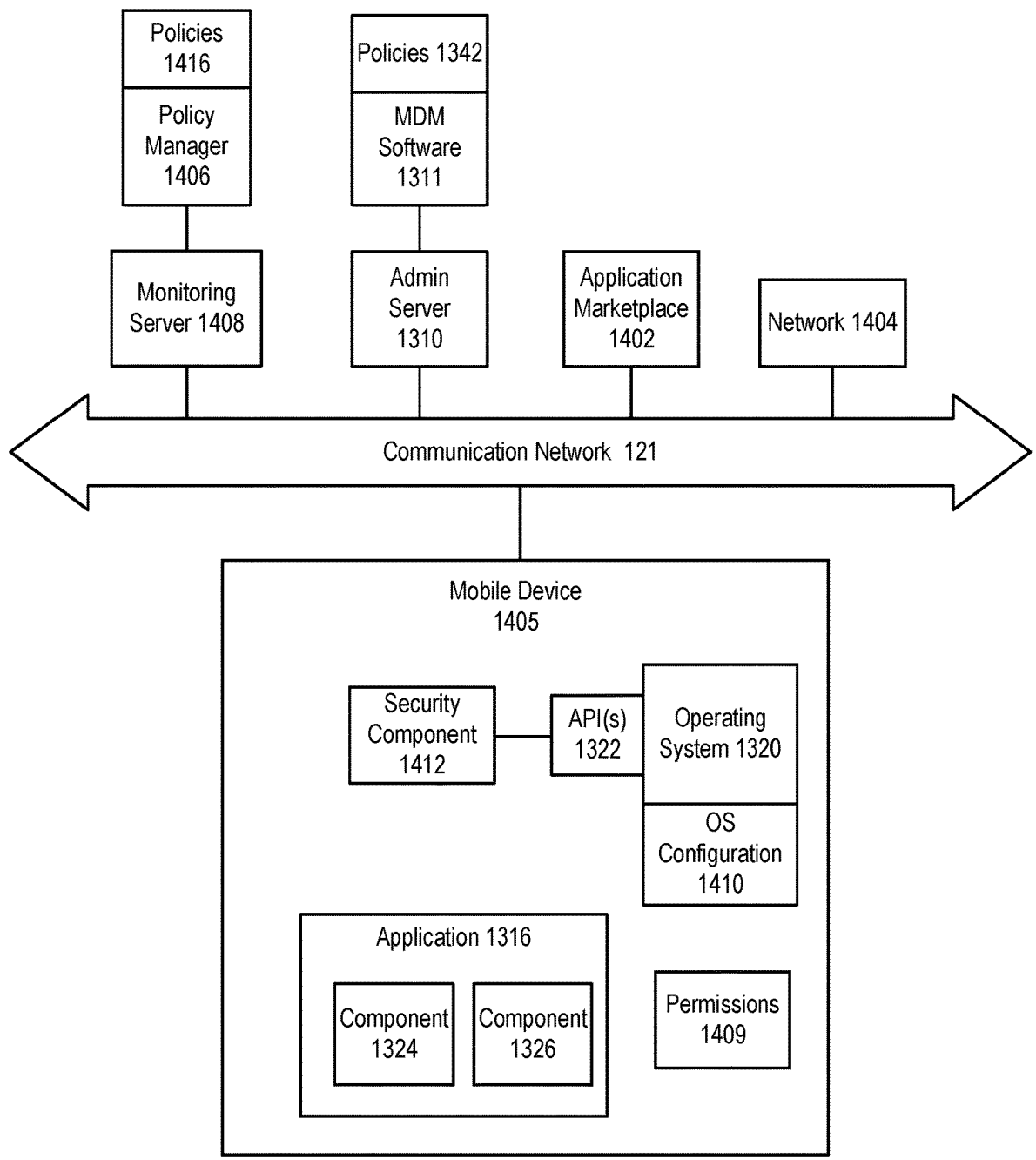
FIG. 3 shows a computing system for monitoring a mobile device for compliance with one or more rules associated with an operating context, according to one embodiment.

FIG. 3 shows a computing system for monitoring a mobile device 1405 for compliance with one or more rules associated with an operating context, according to one embodiment. In one example, the one or more rules are selected from one or more of policies 1416 and/or policies 1342. In one embodiment, monitoring server 1408 monitors mobile device 1405 for compliance with policies 1416. Monitoring server 1408 is an example of monitoring server 150. For example, policy manager 1406 is software on monitoring server 1408 used to monitor this compliance.

In one embodiment, monitoring server 1408 also optionally can manage permissions associated with one or more computing devices, according to one embodiment. Monitoring server 1408 executes policy manager 1406 to manage permissions associated with various computing devices including mobile device 1405. Monitoring server 1408 stores policies 1416 in memory (not shown). Policies 1416 are implemented by policy manager 1406 on mobile device 1405.

In one embodiment, policies 1416 correspond to an enterprise policy. Permissions 1409 for various software on mobile device 1405 are maintained by policy manager 1406 to be in compliance with policies 1416. In one example, admin server 1310 transmits data regarding policies 1342 to monitoring server 1408, which data is used to update policies 1416 as regards acceptable permissions for mobile device 1405. In one embodiment, mobile device management software 1311 is executed by admin server 1310 and is used to manage mobile device 1405 along with other computing devices.

In one embodiment, monitoring server 1408 determines a change of context for mobile device 1405. For example, monitoring server 1408 may determine that mobile device 1405 is attempting to connect to network 1404. In another example, monitoring server 1408 may determine that mobile device 1405 is attempting to install software from application marketplace 1402.

In response to determining the change of context, monitoring server 1408 determines whether mobile device 1405 is in violation of one or more policies 1416 associated with a new context of mobile device 1405 and/or determines a configuration of permissions 1409. In response, monitoring server 1408 can revoke one or more permissions for software on mobile device 1405 based on the change of context. Security component 1412 resides on mobile device 1405 and can be used to revoke or deny permissions on mobile device 1405. In one embodiment, security component 1412 also can implement changes to a configuration 1410 of operating system 1320. In one embodiment, security component 1412 uses one or more application programming interfaces (APIs) 1322 in order to make modifications to operating system 1320. In one embodiment, these APIs permit security component 1412 to, in response to determining that mobile device 1405 is in violation of one or more rules, modify or substitute component 1324 or 1326 of application 1316.

At a later time, monitoring server 1408 determines a change of context for mobile device 1405 to a different context. For example, the change of context may be termination of access to network 1404. In response to determining this change of context, monitoring server 1408 causes restoring of a permission for software on mobile device 1405. In one example, the permission restored can be a permission that was previously revoked when mobile device 1405 accessed network 1404.

Figure 4:
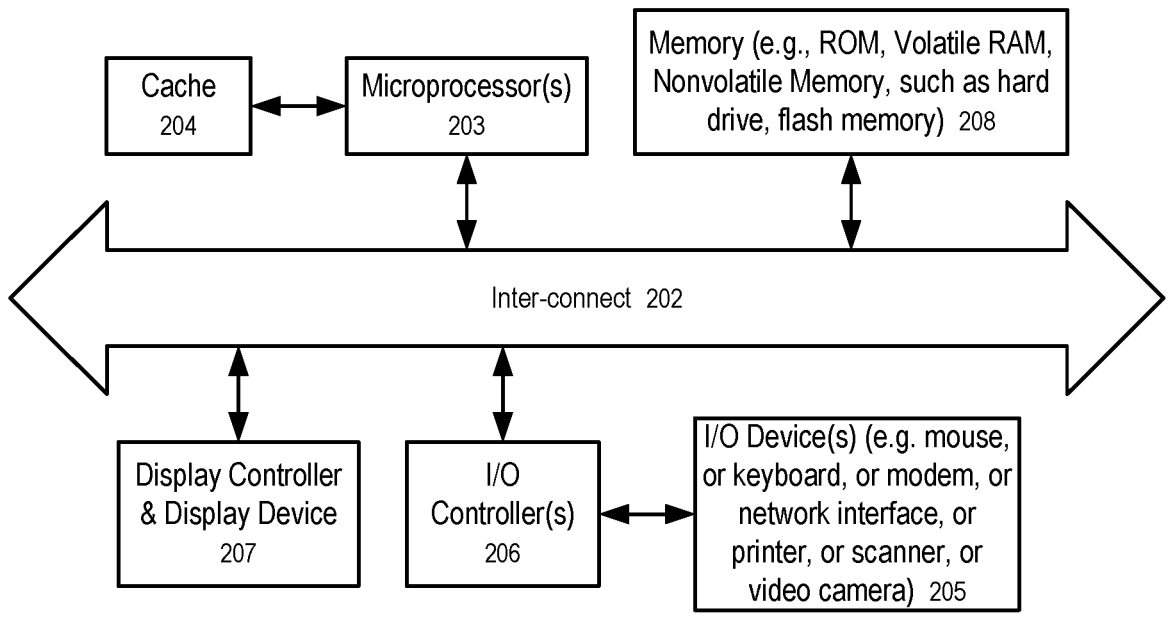
FIG. 4 shows a block diagram of a computing device (e.g., a monitoring server, or an administrator server) which can be used in various embodiments.

FIG. 4 shows a block diagram of a computing device 201 (e.g., monitoring server 150, 1408, or administrator server 1310), which can be used in various embodiments. While FIG. 4 illustrates various components, it is not intended to represent any particular architecture or manner of interconnecting the components. Other systems that have fewer or more components may also be used. In an embodiment, a monitoring server, an administrator server, an authenticity server, or an identity provider may each reside on separate computing systems, or one or more may run on the same computing device, in various combinations.

In FIG. 4, computing device 201 includes an inter-connect 202 (e.g., bus and system core logic), which interconnects a microprocessor(s) 203 and memory 208. The microprocessor 203 is coupled to cache memory 204 in the example of FIG. 4.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the computing device. A non-volatile memory that is remote from the computing device, such as a network storage device coupled to the computing device through a network interface such as a modem or Ethernet interface, can also be used.

In one embodiment, a computing device as illustrated in FIG. 4 is used to implement monitoring server 150, application marketplace 123, service provider 170, administrator server 1310, and/or other servers.

In another embodiment, a computing device as illustrated in FIG. 4 is used to implement a user terminal or a mobile device on which an application is installed or being installed. A user terminal may be in the form, for example, of a notebook computer or a personal desktop computer.

In some embodiments, one or more servers can be replaced with the service of a peer to peer network of a plurality of data processing systems, or a network of distributed computing systems. The peer to peer network, or a distributed computing system, can be collectively viewed as a computing device.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 5:
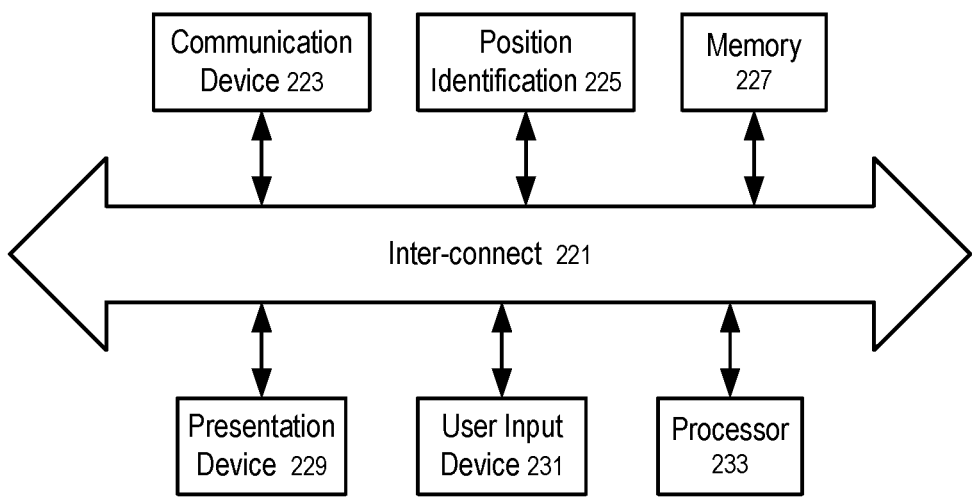
FIG. 5 shows a block diagram of a computing device (e.g., a mobile device of a user, or a user terminal), according to one embodiment.

FIG. 5 shows a block diagram of a computing device (e.g., a mobile device of a user or a user terminal), according to one embodiment. In FIG. 5, the computing device includes an inter-connect 221 connecting the presentation device 229, user input device 231, a processor 233, a memory 227, a position identification unit 225 and a communication device 223.

In FIG. 5, the position identification unit 225 is used to identify a geographic location. The position identification unit 225 may include a satellite positioning system receiver, such as a Global Positioning System (GPS) receiver, to automatically identify the current position of the computing device.

In FIG. 5, the communication device 223 is configured to communicate with a server to provide data, including application data (e.g., an application identifier and a source identifier for a newly-sourced application). In one embodiment, the user input device 231 is configured to receive or generate user data or content. The user input device 231 may include a text input device, a still image camera, a video camera, and/or a sound recorder, etc.

Figure 6:
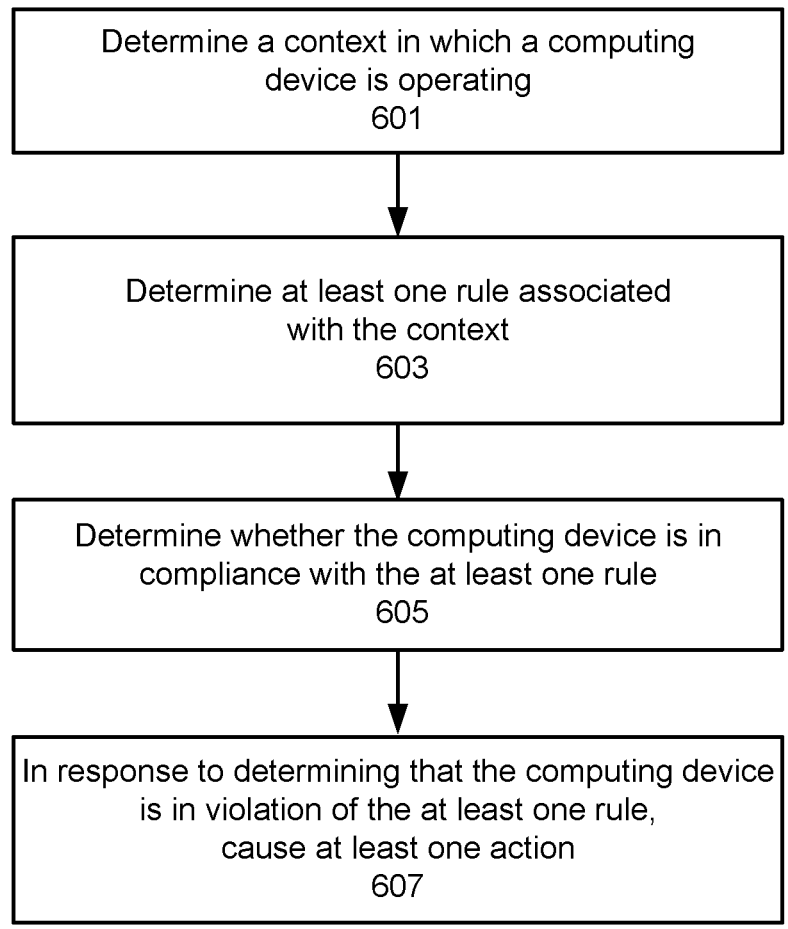
FIG. 6 shows a method for performing one or more actions in response to determining that a computing device is in violation of one or more rules associated with a context in which the computing device is operating, according to one embodiment.

FIG. 6 shows a method for performing one or more actions in response to determining that a computing device is in violation of one or more rules associated with a context in which the computing device is operating, according to one embodiment. For example, the method of FIG. 6 can be implemented in the system of FIGS. 1, 2, and 3.

The method of FIG. 6 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 6 is performed at least in part by one or more processors of monitoring server 150 of FIGS. 1 and 2, or server 1408 of FIG. 3. In one embodiment, monitoring server 1408 is implemented using the processors and memory of FIG. 4 or 5.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 601, a context in which a computing device is operating is determined. For example, monitoring server 150 determines a context in which mobile device 149 is operating.

At block 603, at least one rule associated with the context is determined. For example, monitoring server 150 determines one or more rules 116 that are associated with the context of mobile device 149.

At block 605, it is determined whether the computing device is in compliance with the at least one rule. For example, monitoring server 150 determines whether mobile device 149 is in compliance with one or more rules 116.

At block 607, in response to determining that the computing device is in violation of at least one rule, at least one action is caused. For example, monitoring server 150 determines that mobile device 149 is in violation of one or more rules 116. In response, monitoring server 150 performs one or more actions. For example, the action can be sending a communication to mobile device 149 and/or to another computing device, such as a computing device of service provider 170. For example, the action can be modification or substitution of one or more components on mobile device 149. In one example, the components relate to encryption and/or decryption. In one example, application 1013 is repackaged by monitoring server 150 or service provider 170 and sent to mobile device 149 for installation.

In one embodiment, a method comprises: determining a context in which a computing device (e.g., mobile device 2201) is operating; determining at least one rule (e.g., rules 116) associated with the context; determining whether the computing device is in compliance with the at least one rule; and in response to determining that the computing device is in violation of the at least one rule, causing at least one action.

In one embodiment, the at least one action comprises modifying or substituting a component (e.g., one or more of components 2211) of software on the computing device.

In one embodiment, the computing device is a first computing device, and modifying or substituting the component of the software includes receiving, by the first computing device, a modified or substitute component from a second computing device.

In one embodiment, the at least one action comprises selecting a first software component or application that is compliant with the at least one rule when executed on the computing device.

In one embodiment, the first software component is selected from a plurality of software components on the computing device, the context includes a geographic location, and the first software component is selected based on the geographic location.

In one embodiment, the at least one action comprises sending a communication to the computing device that causes display of a warning regarding the violation to a user of the computing device.

In one embodiment, the computing device stores first data (e.g., stored data 2215) using a first security process, the first data is stored in violation of the at least one rule, and the at least one action comprises: decrypting the first data to provide decrypted data; and encrypting the decrypted data using a second security process to provide second data that is compliant with the at least one rule when stored on the computing device.

In one embodiment, the at least one rule is associated with at least one of a cryptographic requirement or a privacy requirement.

In one embodiment, determining the context comprises determining a geographic location of the computing device.

In one embodiment, determining the context comprises determining a network (e.g., network 172) being accessed by the computing device.

In one embodiment, the computing device is a first computing device (e.g., mobile device 2201); determining whether the first computing device is in compliance with the at least one rule is performed by a second computing device (e.g., monitoring server 150); and the at least one action is caused by the second computing device.

In one embodiment, the computing device stores a table (e.g., table 2213) comprising rules and corresponding geographic locations, and determining the at least one rule comprises using, by the computing device, the determined context to look up the at least one rule in the table.

In one embodiment, the computing device is a first computing device; the first computing device determines, based on a communication from a second computing device, that a first software component on the first computing device is in violation of the at least one rule; and the at least one action comprises: substituting the first software component with a second software component obtained from the second computing device, or modifying the first software component to be compliant with the at least one rule.

In one embodiment, the computing device is a first computing device (e.g., mobile device 2201), and the at least one rule is a policy (e.g., rules 116) enforced by a second computing device (e.g., monitoring server 150) on a plurality of computing devices including the first computing device.

In one embodiment, the policy is a first policy (e.g., policies 1416), the first computing device stores a second policy that is in conflict with the first policy regarding compliance of a software component with the at least one rule, and the at least one action comprises modifying or substituting the software component consistent with the first policy.

In one embodiment, the computing device stores a policy, and the at least one action comprises modifying or substituting a component of software on the computing device consistent with the policy.

In one embodiment, the computing device is a first computing device, and the at least one action comprises sending, by a second computing device, a communication to the first computing device that indicates the violation, and the method further comprises: receiving, by the second computing device, a confirmation of the communication from the first second computing device; and in response to receiving the confirmation, causing, by the second computing device, substitution or modification of a software component on the first computing device.

In one embodiment, a system comprises: at least one processor; and memory storing instructions configured to instruct the at least one processor to: determine a context in which a computing device is operating; determine at least one rule associated with the context; determine whether the computing device is in compliance with the at least one rule; and in response to determining that the computing device is in violation of the at least one rule, cause at least one action.

In one embodiment, the context includes a geographic location, and the instructions are further configured to instruct the at least one processor to: determine that the computing device is lost or stolen; wherein the at least one action includes at least one of reducing service to the computing device, denying service to the computing device, or requiring authentication from the computing device.

In one embodiment, a non-transitory computer-readable storage medium stores computer-readable instructions, which when executed, cause a first computing device at least to: determine a context in which a second computing device is operating; determine at least one rule associated with the context; determine whether the second computing device is in compliance with the at least one rule; and in response to determining that the second computing device is in violation of the at least one rule, cause at least one action.

In one embodiment, a method comprises: determining at least one encryption level for applications installed on a computing device; determining a context in which the computing device is operating, wherein determining the context comprises identifying a geographic location of the computing device; determining at least one rule associated with the context, wherein determining the at least one rule comprises identifying a security policy, the security policy corresponding to allowed encryption levels associated with the identified geographic location of the computing device; determining whether the computing device is in compliance with the at least one rule; and in response to determining that the computing device is in violation of the at least one rule, causing at least one action.

In one embodiment, determining the at least one encryption level for applications installed on the computing device comprises determining a security policy being implemented by the computing device for the installed applications.

In one embodiment, the computing device is a first computing device, and the at least one rule comprises a first policy enforced by a second computing device on a plurality of computing devices including the first computing device.

In one embodiment, modification or substitution of a component is implemented by an installed application and is permitted by the operating system on the device. For example, the operating system provides an API or interface that can be used by security component 1412 to make the substitution in real-time.

In one embodiment, an alternative to a real-time substitution of component (e.g., such as discussed above) can include one or more of the following actions. In one example, these actions can be performed by an application developer or by an application marketplace. The alternative actions include:

Repackaging an application and doing the substitution of component during the repackaging (e.g., the repackaging can be done by monitoring server 150 or mobile device 149).

Choosing a different application (e.g., which already includes the substituted component, such as via repackaging above) to execute (e.g., if a user of mobile device 149 is launching), or warning a user to launch the different application instead.

Choosing a different application to download from an application store (e.g., application marketplace 123). In one example, the different application is chosen to download based on the different application already including the desired substituted component. In one example, the different application chosen can additionally and/or alternatively be based on the location of the mobile device.

When more than one version of a component or an application are installed on a computing device, then dynamically choosing which one of the component or application to use depending on the determined geographic context (or alternatively advising a user to launch the other component or application version). In one example, the application developer (or other computing device that is controlling a substitution) can automatically switch to the other component or application if it is more appropriate or complies with respect to the current geographic context. In one embodiment, monitoring server 150 determines the component or application that is most appropriate and sends a communication to service provider 170 or another computing device indicating this choice. The service provider 170 or other computing device, such as a developer server, causes the switching to the other component or application on mobile device 149.

In some cases, a computing device can be lost or stolen. Service providers (e.g., banks, or other financial providers) need to know if a device being used to access their service (e.g., via an app or browser) has been stolen, so that the service provider can take appropriate action (e.g., deny service, reduce service level, require additional authentication, etc.). Also, when a device is lost or stolen, a device user can be concerned about the fact that the user has a sensitive app on the device (e.g., a banking app). Also, the service provider may be concerned that a lost or stolen device could be used to perform fraudulent transactions. In some examples, the service provider is a cloud storage provider, or a network-accessible service provider.

In the physical world, if a user loses a credit or debit card, the user can report the loss of the card to the card issuer. In the cyber/mobile world, a financial or payment or banking app may involve the same or greater risk of financial loss to the device user, or the financial service provider, or both. Thus, there is a need for a digital counterpart to the "report a lost card" functionality.

A device can enter a lost/stolen mode, for example, via several paths. For example, a user can report a device as lost or stolen by using a website or other computing system interface to report the device as lost or stolen. For example, a user can contact a carrier for the device, interact with the carrier's customer care support function, and report the device as lost or stolen. The customer care support representative may be using a special access to a software interface to mark the device as lost or stolen.

In one embodiment, at a server (e.g., monitoring server 150), a device is marked as being lost/stolen (e.g., marked in a record of a database). The server can include a list of sensitive apps (e.g., banking apps) which are installed on the device. The server transmits a notification to the organization (e.g., the bank) responsible for the application, that a user which has their organization's app on the user's device has reported the device lost or stolen.

In one embodiment, the service provider receives the notification. Optionally, a service can be suspended or require additional authentication steps to perform a transaction.

In one embodiment, the user has recovered a phone which had previously been marked as lost/stolen. For example, the user is prompted "this device had been marked as lost/ stolen; if you have recovered it please enter your password to mark this device as recovered."

In one embodiment, at a server, a request is received to mark a previously-lost/stolen device as recovered. A notification is transmitted to service provider(s) associated with app(s) on the device that the device has been recovered. In one embodiment, the security level can be set back to normal authentication requirements, or service can be restored if it had been suspended.

In one embodiment, the mobile device (e.g., mobile device 149) was being used as an authenticator (e.g., a FIDO authenticator which stores per-site key pairs) prior to being lost or stolen. A security server in the cloud (e.g., monitoring server 150) has been previously notified or otherwise has knowledge of which sites the mobile device had used FIDO registration for (e.g., such notification having occurred any time from the time of registration or later). After a device has been determined to be lost (e.g., reported as such or otherwise determined as lost or stolen), one or more such sites (e.g., service provider 170) or cloud services for which the mobile device was a FIDO authenticator can be notified as to the fact that the device is lost or stolen. In one embodiment, this functionality is an SDK component used by a third party developer in their mobile app or other software (e.g., a banking or payment app).

In one embodiment, a software application on mobile device 2201 itself determines that mobile device 2201 is operating in violation of one or more rules 116. The software application then initiates a component substitution. The component can be pre-installed on mobile device 2201, or can be downloaded from monitoring server 150 or another computing device over a communication network 121. In addition, the user of mobile device 2201 is provided a notification of the violation and/or the component substitution. In one embodiment, the user provides an approval for the component substitution. In one embodiment, the component substitution is performed automatically without requiring user approval. In one embodiment, the user has pre-authorized the component substitution.

In one embodiment, mobile device 2201 determines that it has changed locations to a new territory. For example, the definition of a new territory can be predetermined and stored in a table of data in memory 2212. In response to determining the change of location, mobile device 2201 sends a request to monitoring server 150. In response, monitoring server 150 sends a communication causing mobile device 2201 to perform one or more actions, such as discussed above. The communication may also include data regarding rules 116 and/or a violation of these rules when operating in the new territory.

In one embodiment, the communication to mobile device 2201 indicates that no application is available that will comply with local regulatory requirements. In one embodiment, the communication indicates operational functional aspects and/or risks associated with using a new substitute component in the new territory. For example, the communication may indicate that data is more likely to be intercepted or stolen due to weaker encryption.

In one embodiment, in response to determining a violation, monitoring server 150 re-wraps an application with substitute components, and then sends the rewrapped application to mobile device 2201. In one example, the application will be functionally the same application, but with one or more of the components substituted.

In one embodiment, mobile device 1405 enters a new territory. Application 1316 is managed by MDM software 1311. Monitoring server 1408 determines that operation of application 1316 in the new territory violates one or more of policies 1342. In response, monitoring server 1408 causes security component 1412 to disable application 1316. In one embodiment, application 1316 itself makes a determination to become inactive when detecting that mobile device 1405 has entered the new territory.

In one embodiment, application 1316 communicates to MDM software 1311 that mobile device 1405 has entered a new territory. Monitoring server 1408 or admin server 1310 determines that operation of application 1316 in the new territory violates one or more of policies 1416 or policies 1342. In response to this determination, one or more actions are performed. For example, security component 1412 can disable application 1316, or blackhole network traffic to or from application 1316.

In one embodiment, based on a determination that operation of an application will violate at least one rule, mobile device 1405 provides a warning notification by display in a user interface. In one embodiment, this warning notification is provided in response to an attempt by user to launch an application, or shortly after launching the application. In one embodiment, a notification is provided to the user indicating an alternative application that can be downloaded by the user, or that is already present on mobile device 1405.

In one embodiment, mobile device 1405 includes a FIDO (Fast IDentity Online) authenticator. In one example, the FIDO authenticator is implemented by an application on mobile device 1405. In one embodiment, in response to determining a context for mobile device 1405, one or more websites and/or other computing devices for which the phone has been registered as an authenticator is notified by communication over communication network 121. For example, the notification can indicate that mobile device 1405 has been reported as, or is believed to be, lost or stolen.

In one embodiment, behavioral and/or structural characteristics of a component present in a new application may be identified. This may be, for example, an application 1013 that has been installed on mobile device 149. These characteristics may be inputs to a context determination above.

In one embodiment, there are various ways to identify characteristics that are actually present in a component of an application. In one embodiment, information is gathered from an application on a mobile device for further processing at a server. According to this embodiment, information that has been gathered is then used for component analysis at the identity provider (discussed above) in order to identify characteristics of a component.

In another embodiment, behavioral characteristics may be determined or collected using other approaches. For example, behavior may be determined based on network traffic (e.g., SMS, IP) data, or based on the code source of a given behavior (e.g., a class name or a package name responsible for geo-locating, or a fingerprint of a code segment responsible for sending SMS traffic).

In various other embodiments, the results from component identification for applications on a device are presented to the user. The user may provide input in a user interface to define or update a user policy based on this component identification. For example, the user may opt-out of an identified component.

In an embodiment, a system can provide advisement about applications on mobile devices such as smartphones, netbooks, and tablets. A server gathers data about mobile applications, analyzes the applications, and produces an assessment that may advise users on a variety of factors, including security, privacy, battery impact, performance impact, and network usage. Users are helped to understand the impact of applications to improve the experience in using their mobile device. A server is enabled to feed information about applications to other protection systems such as application policy systems and network infrastructure. Advisement about applications can be presented in a variety of forms, such as through a mobile application, as part of a web application, or integrated into other services via an API. The data gathered by the server may be used, for example, as one or more inputs in the plurality of inputs for evaluating the first application as described herein. Also, some of the forms of advisement discussed may be used, for example, in providing notifications to the user and/or to developers or others regarding evaluations of software authenticity.

In one embodiment, security evaluation and scoring is related to a plurality of trust factors. For example, some of the trust factors may be used as inputs when evaluating application authenticity.

In one embodiment, there are different interfaces provided for different users to provide information from an authenticity server or otherwise about a result from an evaluation of a mobile device or of the authenticity of software. For the user (e.g., user of a mobile device), there may just be a warning provided (e.g., a popup that states that an application is not authentic). An alternative is a notice that indicates (e.g., an authentication seal that appears in the lower right-hand corner of a window) to the user that this is an authentic application. As one example, a user is presented and sees an authentication seal when a banking application is being installed by the user on its mobile device.

In one embodiment, a method includes: receiving, by an identity broker, a request regarding access by a client device to a service provided by a service provider; in response to receiving the request, determining, by the identity broker, an identity of the client device; determining, by at least one processor of the identity broker, whether the client device is in a secure state; in response to determining that the client device is in the secure state, sending, by the identity broker, an authentication request for the client device to an identity provider, the authentication request including the identity of the client device; receiving, by the identity broker from the identity provider in response to the authentication request, an authentication that authorizes the access by the client device; and in response to receiving the authentication from the identity provider, sending, by the identity broker, a communication to the service provider that approves the access by the client device.

In an embodiment an identity broker can be is an intermediary service that connect one or more service providers with one or more identity providers. The identity provider can be a system entity that creates, maintains, and manages identity information while providing authentication services to relying applications within a federation or distributed network. In an embodiment, the Identity providers can facilitate connections between cloud computing resources and user devices, thus decreasing the need for users to re-authenticate when using mobile and roaming applications.

In one example, the client device seeking access to the service is mobile device 149 of FIG. 1. In one example, the client device is requesting access to a service provided by service provider 170 of FIG. 1. In one example, the identity broker resides in monitoring server 150 of FIG. 1. In another example, the monitoring server 150 performs a security evaluation of risk factors associated with mobile device 149, and the monitoring services requests access to a service provided by the service provider via an identity broker which is communicatively coupled to the security provider associated with the service provider. In at least one embodiment, the identity broker is a service on the SaaS service.

In one example, the identity broker is executed by a virtual machine residing in a cloud network of computing devices. In one example, the client device is requesting access to a service operating using a software as a service (SaaS) model, in which users gain access to application software and databases as part of the service provided to client devices (e.g., mobile device 149) by a service provider. In one example, a cloud provider manages the infrastructure and platforms that run applications operating using the SaaS model. In one example, the cloud provider installs and operates application software in the cloud, and cloud users access the software from cloud clients. In one example, the cloud client is installed on the client device.

In one example, the service is provided to client devices by a server of an enterprise. The service may be based on any of various enterprise applications. Client software is installed on the client device, and the corresponding enterprise software is installed on one or more servers operated and/or controlled by the enterprise. In one example, the servers are operated within a cloud environment.

In one embodiment, a computing device executes an identity broker software component that sits between a SaaS application and an external identity provider (e.g., the SaaS application is configured to point to the identity provider for authentication of some or all access requests from user devices). In one example, the computing device is part of a security platform used to evaluate authenticity of various software applications and/or other components prior to installing the software on mobile devices of users (e.g., users that are employees of a company). The identity broker checks for user device compliance before allowing the user to access the SaaS application on the user's mobile device. The identity broker uses the security platform as part of performing this check.

Device compliance can be determined based on one or more policies. In some embodiments the compliance is based on the risk levels (can be defined in policies) or risks tolerated by the enterprises, services, device users, or user groups. A policy can be service specific, for example a banking service can have a policy requiring a secure network connection and when the networking connection is not secure, the device can be identified as "not compliant." In another example, the policies can be applicable to all enterprise services, or specific to a device user or user group. For example, in an enterprise the executive team can be associated with a compliance policy different from the policies associated with other employees.

In at least one embodiment, the identity broker checks for mobile device compliance by requesting the compliance information from the security component associated with the mobile device. In another embodiment, the identity broker is notified by the security component associated with the mobile device about mobile device compliance. In at least one embodiment, the identity broker revokes access to the service based on the security state associated with the mobile device.

In one example, the identity broker uses historical data stored by the security platform which in at least one embodiment is transmitted to the identity broker by the security component. In one example, the historical data includes information regarding undesirable behavior or other risks associated with particular software applications and/or components (e.g., that have been previously installed on other user devices monitored by the security platform). In one example, the identity broker uses risk assessments from the security platform that are based on comparison of a software component on a user device to a similar component stored in a data repository. In one example, the comparison is based on behavioral and/or structural characteristics.

In one embodiment, after a user device has been granted access to a service, the security component in association with the identity broker continues to monitor risk associated with the device. In one example, this permits the identity broker to continuously monitor device compliance. In one example, if a device becomes non-compliant, then the identity broker, responsive to the security component notification, can communicate this status to the service provider and/or the identity provider. In one example, this communication causes revocation of access by the client device. In one example, the lack of compliance causes the SaaS client to be automatically removed from the affected user device. In one example, the identity broker and/or security component requires confirmation that the SaaS client has been removed from the user device prior to permitting further access to the service and/or to a network over which the user device was accessing the service. In one example, the network over which the user device accesses the service is network 1404 of FIG. 3. In one embodiment, the identity broker being in the middle of the authentication process and being the issuer of the authentication session to the SaaS server can revoke the session that it has issued.

Figure 7:
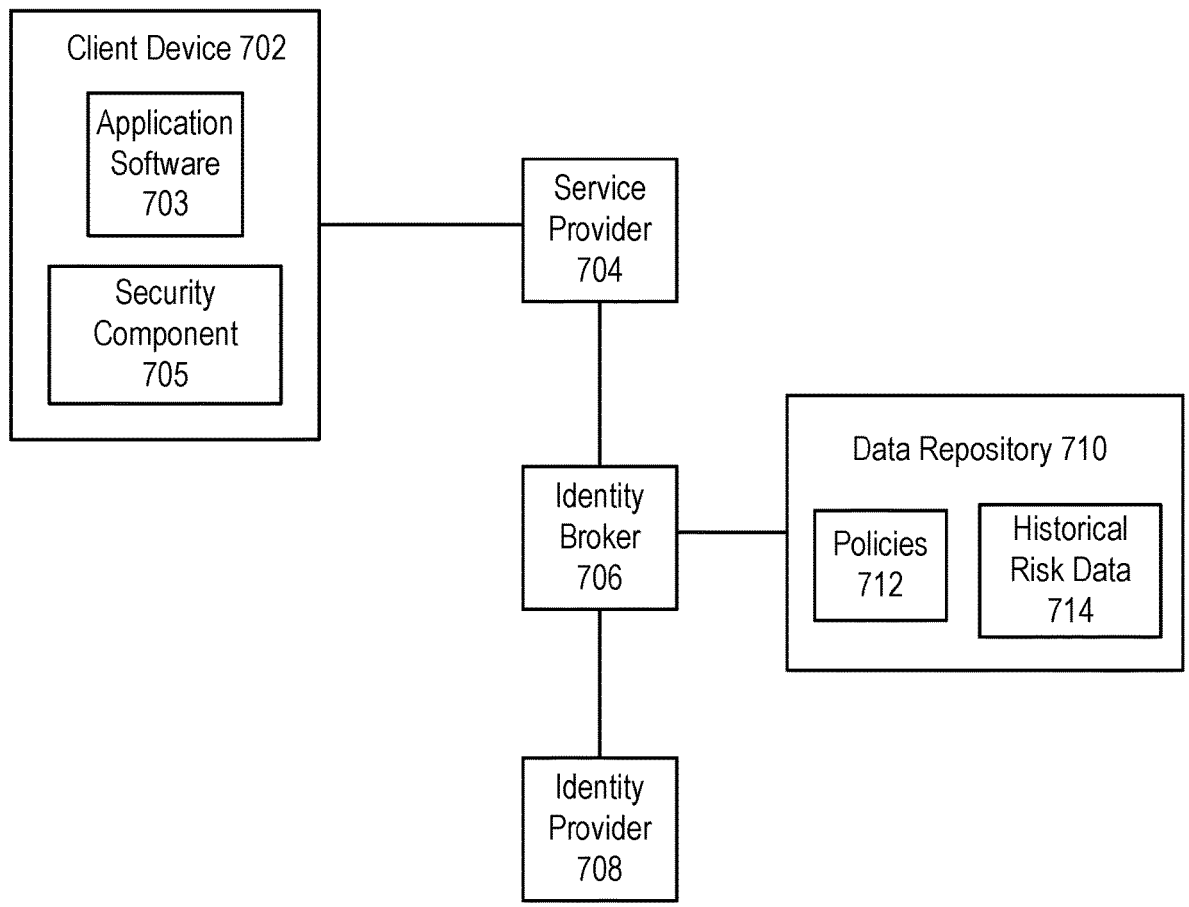
FIG. 7 shows a system for monitoring security of a client device using an identity broker located between a service provider and an identity provider, according to one embodiment.

FIG. 7 shows a system for monitoring security of a client device 702 using an identity broker 706 located between a service provider 704 and an identity provider 708, according to one embodiment. Application software 703 that resides on client device 702 makes a request to access a service provided by service provider 704. In one example, application software 703 is a software client used to access a SaaS application.

In one example, the service is provided by a SaaS application executing on service provider 704. In one example, service provider 704 is a virtual machine executing on one or more computing devices in a cloud network. In one example, service provider 704 is a server implemented using one or more computing devices. In one example, the identity provider 708 is a computing device that provides authentication services for various servers or other computing devices.

Security component 705 is installed on client device 702. In one example, security component 705 is security component 1412 of FIG. 3. In one example, security component 705 is a software application used by identity broker 706 to collect data regarding a context of operation of client device 702. In one example, the collected data is used by the identity broker 706 to monitor behavior of application software 703 and/or network traffic and/or communications associated with the service being provided by service provider 704. In one example, this monitored behavior is compared to historical risk data 714 stored in a data repository 710. In one example, the identity broker 706 can additionally perform one or more functions of monitoring server 1408 and/or admin server 1310 of FIG. 3.

Various policies 712 are stored on data repository 710. In one example, policies 712 correspond to user policies enforced by service provider 704 on various client devices including client device 702. In one example, policies 712 are policies 1342 of FIG. 3 and are enforced and/or published by MDM software 1311. In one example, policies 712 are policies 1416 of FIG. 3.

Identity broker 706 monitors client device 702 to determine compliance with one or more of policies 712. In one example, one of policies 712 is updated while client device 702 is accessing the service. Identity broker 706 determines based on this monitoring that client device 702 is no longer compliant with the updated policy. Identity broker 706 sends a communication to service provider 704 indicating the lack of compliance and/or causing revocation of access to the service.

In one embodiment, identity broker 706 performs device risk validation for client device 702. First, an identity of client device 702 is determined using a pre-provisioned PKI client certificate of client device 702. In one example, a user of client device 702 has previously installed the client certificate on client device 702. In at least one embodiment, the mobile device is associated with multiple certificates. Each of the certificates can be associated with applications, SaaS providers, or services. For example, the mobile device can have certificate A installed which is associated with the word processing SaaS provider, and an installed certificate B which can be associated with an email SaaS provider. In at least one embodiment the mobile device can have multiple certificates installed in association with the same SaaS provider, each of the certificates being associated with a different account. For example, a mobile device can have a certificate installed that is associated with service provider A and user account A, and another certification installed that is associated with the service provider A, and user account B. In an embodiment, the certificates are associated with various security policies. For example, some certificates can be associated with applications, providers, or services that have a low risk tolerance, and other certificates can be associated the applications, providers, or services having a high-risk tolerance. Based on the risk tolerance associated with the certificates, the decisions on actions to take based on the reported security state can vary.

Next, identity broker 706 verifies compliance of client device 702 to enterprise security policies stored as part of policies 712 in data repository 710. The identity broker 706 can also verifies compliance of client device 702 via the security component to enterprise security policies stored as part of policies 712 in data repository 710. If client device 702 is determined to be compliant with the enterprise security policies, then identity broker 706 forwards an authentication request to the identity provider used for user authentication by service provider 704. In at least one embodiment, the security component notifies the identity broker about the security state of the mobile device and the identity broker issues a request to the mobile device, identity provider, and/or SaaS service/provider to take action such as revoking access to the mobile device to a specific service related to the security certificate associated with a specific service.

If the identity provider 708 approves client device 702, then service provider 704 establishes a session for client device 702 at the SaaS application. After the session is established, identity broker 706 continuously monitors compliance of the client device 702 with risk and/or policy requirements. In one example, security component 705 periodically sends telemetry data to identity broker 706 (e.g., using communication network 121). In one example, the telemetry data is sent at least every 30 seconds. In one example, identity broker 706 compares the telemetry data to data stored in data repository 710 to determine a risk level.

If the risk level exceeds a predetermined threshold, identity broker 706 considers client device 702 to be out of compliance. In one example, identity broker 706 assigns a numerical value to the determined risk level and communicates this value to service provider 704 and/or client device 702. In response to the risk level exceeding a predetermined threshold, identity broker 706 sends a communication to service provider 704 that causes revocation of the user's session with the SaaS application. In at least one embodiment, identity broker 706 can be configured to send a communication to service provider 704, and in response to the communication, the service provider can be configured to determine using the associated policies whether to revoke the user's session.

In one embodiment, a client certificate authentication process is required by identity broker 706 prior to sending an authentication request to identity provider 708. In one example, a mTLC handshake occurs between client device 702 and service provider 704. In one example, service provider 704 requests a digital certificate from client device 702 for purposes of authentication. In one example, the client certificate passes the validation process if a digital signature of the client certificate is found to have been signed by a certificate authority recognized by service provider 704, identity broker 706, and/or identity provider 708. Otherwise, the validation fails.

In one example, the client certificate is a digital certificate in the form of a file that is protected by a password and loaded onto client device 702 by a user. In one example, the client certificate contains information such as a digital signature, expiration date, name of client, name of certificate authority, serial number, revocation status, etc.

In one example of the operation of identity broker 706, an employee accesses a corporate resource using client device 702. The request for access is received by service provider 704, which sends an authentication request to identity broker 706. The identity broker 706 or a coupled monitoring server determines if security component 705 is installed on client device 702, and further determines if the client device 702 is a secure state. In one example, the identity broker 706 or a coupled monitoring server determines client device 702 to be in a secure state if a risk level such as discussed above is determined to be below a predetermined threshold.

If the identity broker 706 determines that security component 705 is installed and that the device is in a secure state, then the authentication request is passed to identity provider 708. In one example, the identity provider 708 is an enterprise SSO provider. If the identity provider 708 authenticates client device 702, then identity provider 708 sends a communication to identity broker 706 that includes this authentication. Identity broker 706 forwards the authentication to service provider 704, which permits the employee to access an enterprise application as long as client device 702 is deemed to be safe based on continued monitoring by identity broker 706. In an embodiment, the identity broker 706 forwards the authentication to service provider 704, which permits the employee to access an enterprise application as long as a user identity associated with the client device 702 is deemed to be safe based on continued monitoring.

In one embodiment, identity broker 706 checks for an identity of client device 702 associated with the client device. If the device cannot be identified, identity broker 706 requires that security component 705 and/or a client certificate be installed on client device 702. In one example, a communication is sent to the user of client device 702 requesting the foregoing. After the user confirms or otherwise communicates completion of installation, identity broker 706 again checks the identity.

If client device 702 is identified, then identity broker 706 checks for device compliance. In one example, device compliance requires the device be in a secure state as discussed above. In one example, device compliance further requires the device to be in compliance with policies 712, such as discussed above.

If identity broker 706 determines that the device is not compliant, any existing session with the service provider 704 is revoked. In some cases, the user can be requested to resolve the lack of compliance by taking remediation steps using client device 702 and/or other steps on other computing devices available to the user.

If identity broker 706 determines that the device is compliant, identity broker 706 authenticates the client device 702 via identity provider 708. After client device 702 is granted access to the service and the user has been authenticated by the identity provider, the identity broker 706 continuously checks compliance by client device 702. In one example, a periodic check for compliance determines that the device is no longer compliant (e.g., a risk level exceeds a predetermined threshold and/or the device no longer complies with a policy). After client device 702 is granted access to the service, identity broker 706 continuously checks compliance by client device 702 by continuously monitoring the user identity associated with the client device.

In at least one embodiment, the client device (702) can send a communication to monitoring server (1408) indicating a continuous authentication request. The security component can 705 can be foregrounded and send updates of the secure state at intervals or once a threshold level of threat is identified associated with the client device to monitoring server (1408). In at least one embodiment, when redirected to an identity provider login page (708), a security state of the device from the monitoring server (1408) can be requested. In some embodiments, when it is determined that the security state is a threshold level of threat. In some embodiments, when a threat is identified on the client device and the security component communicates this to the monitoring server, the access to data 710 can be denied/revoked. In at least one embodiment, when the security state of the device is not available from the monitoring server (1408) because the device is considered in a disconnected state (which is due to the security component or security software not having communicated recently with the monitoring server, possibly because an app (a security app) containing the security component or security software has not been running in the background and thus able to periodically check in with the monitoring server, communicating the security state of the device), the identity provider login page (708) uses deep linking to wake up the security app, which determines the security state of the device. The security app communicates with the monitoring server and transmits the security state of the device, and signals the identity provider that it can or should request the now up-to-date security state of the device from the monitoring server.

In at least one embodiment, the identity provider login page (708) can generate a random authentication session number (for example 12789abc). This number can be used as a unique identifier on the monitoring (150) server to check the security state (this number can be generated before the user is even authenticated).

Figure 8:
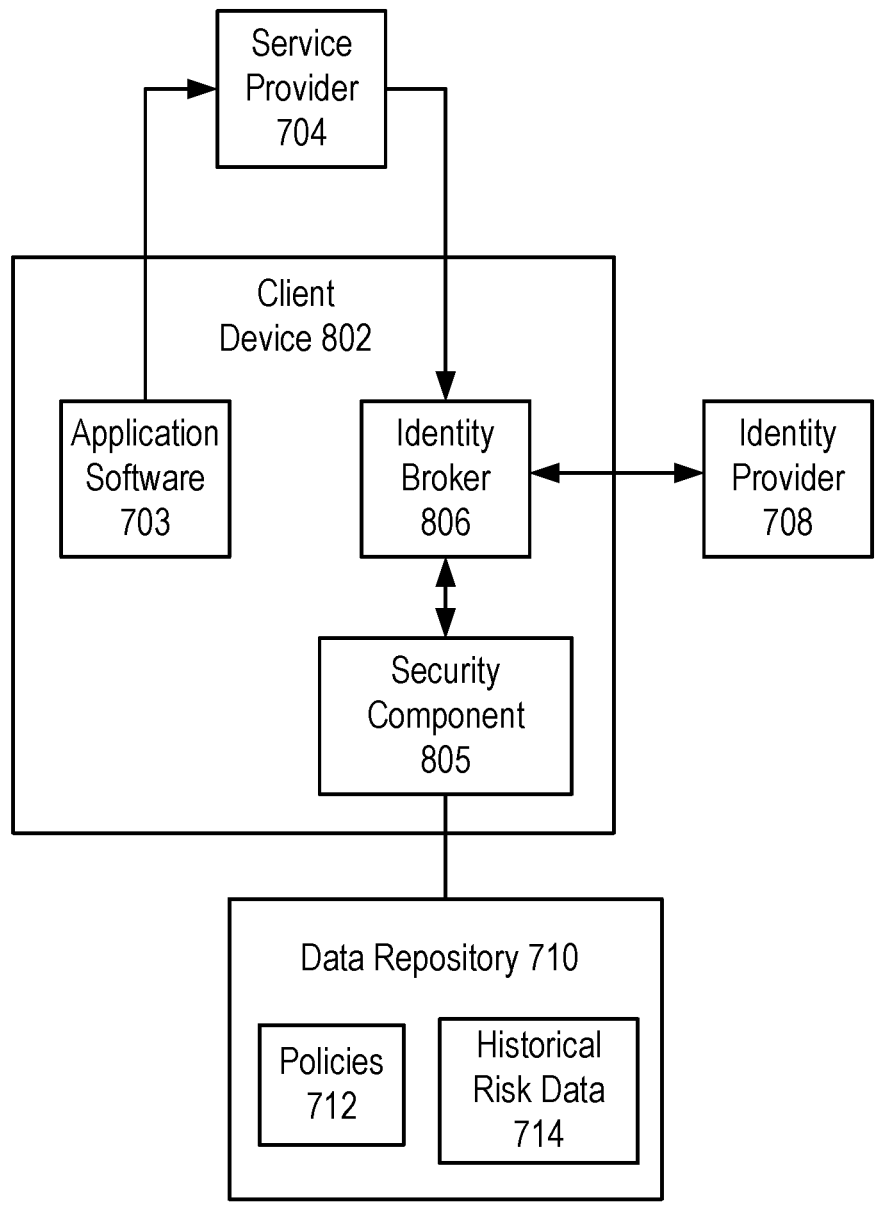
FIG. 8 shows a system for monitoring security of a client device using an identity broker located at the client device, according to one embodiment.

FIG. 8 shows a system for monitoring security of a client device 802 using an identity broker 806 located at the client device 802, according to one embodiment. In one example, identity broker 806 is software installed on client device 802 and has similar functionality as identity broker 706 above. In one example, client device 802 is mobile device 149 of FIG. 1.

A security component 805 is optionally installed on client device 802. In one example, security component 805 has similar functionality as security component 705 above.

In one embodiment, identity broker 806 monitors client device 802 based on data collected from client device 802 by security component 805. The collected data is compared to data repository 710 similarly as discussed above. In some cases, identity broker 806 accesses data repository 710 directly without using security component 805.

In one example, application software 703 sends a request for access to a service provided by service provider 704. Service provider 704 sends a request for authentication to identity broker 806.

Identity broker 806 performs compliance checks regarding identity as discussed above. In one embodiment, the client certificate authentication process described above is not needed because identity broker 806 is installed on client device 802. If the device is found to be compliant, identity broker 806 forwards an authentication request to identity provider 708, similarly as discussed above.

In one example, at the time of authentication of client device 802, application software 703 is configured to use a local link to identity broker 806. During authentication, identity broker 806 acts as an internal server running inside client device 802. Identity broker 806 uses an external server that is acting as identity provider 708. In one example, identity broker 806 functions as an internal server that establishes a session with application software 703 in response to a request for access to a service provided by service provider 704.

Figure 9:
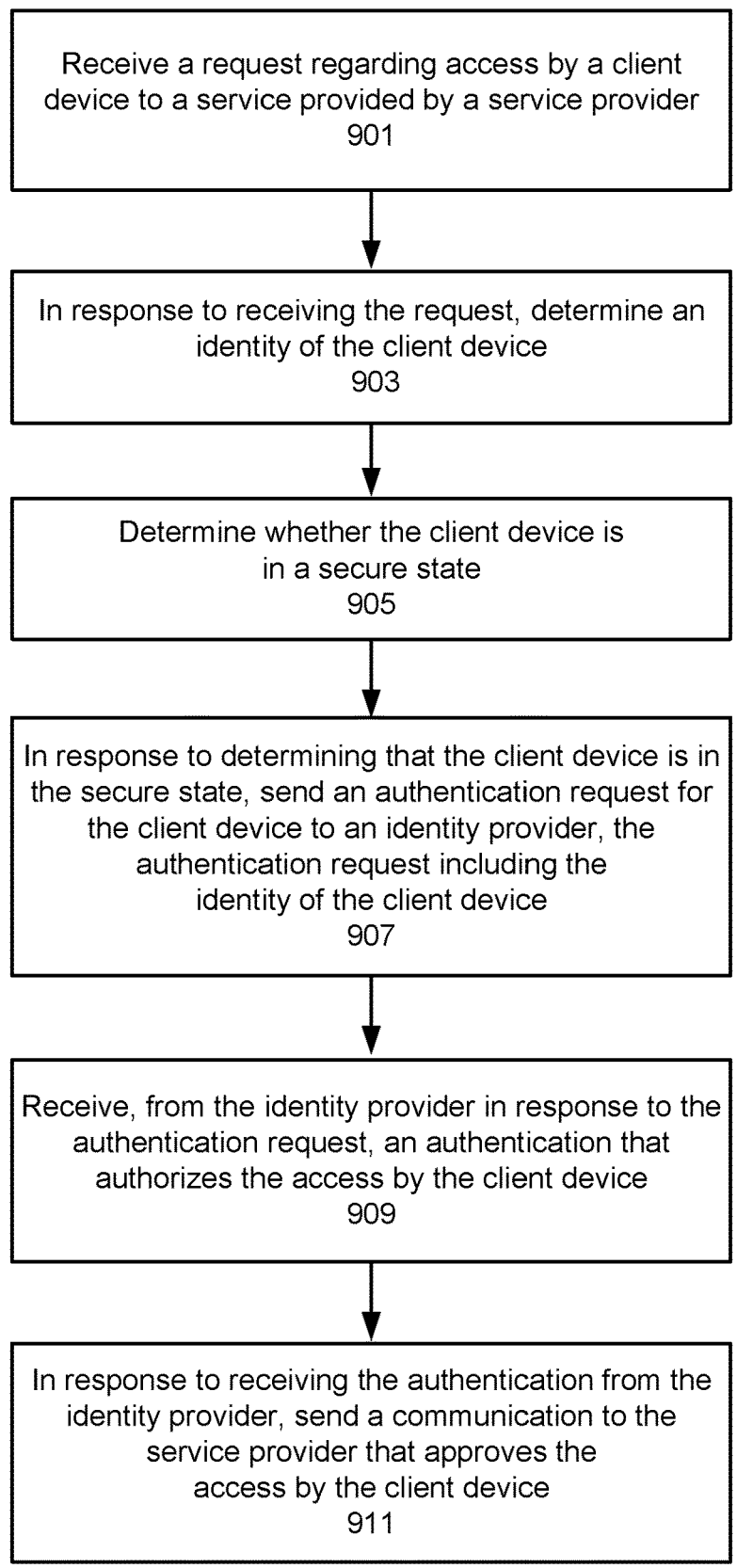
FIG. 9 shows a method for monitoring security of a client device to provide the client device with continuous conditional access to a server, according to one embodiment.

FIG. 9 shows a method for monitoring security of a client device to provide the client device with continuous conditional access to a server, according to one embodiment. For example, the method of FIG. 9 can be implemented in the system of FIGS. 7 and 8.

The method of FIG. 9 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof.

In some embodiments, the method of FIG. 9 is performed at least in part by one or more processors of identity broker 706 of FIG. 7. In one embodiment, identity broker 706 is implemented using the processors and memory of FIG. 4 or 5.

Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At block 901, a request is received regarding access by a client device to a service provided by a service provider. In one example, the request is received by service provider 704 from client device 702 when application software 703 is attempting to gain access to a service provided by service provider 704.

At block 903, in response to receiving the request, an identity associated with the client device is determined. In one example, service provider 704 sends a communication to identity broker 706 requesting that an identity of client device 702 be determined.

At block 905, it is determined whether the client device is in a secure state. In one example, identity broker 706 determines the identity of client device 702. In response to determining the identity, identity broker 706 determines a risk level of client device 702 based on data collected by security component 705.

At block 907, in response to determining that the client device is in the secure state, an authentication request for the client device is sent to an identity provider. The authentication request includes the identity of the client device. In one example, identity broker 706 sends a communication with an authentication request to identity provider 708.

At block 909, an authentication is received from the identity provider in response to the authentication request. The authentication authorizes the access by the client device. In one example, identity provider 708 approves access by client device 702 and sends an authentication communication to identity broker 706.

At block 911, in response to receiving the authentication from the identity provider, a communication is sent to the service provider that approves the access by the client device. In one example, identity broker 706 sends an authentication authorization to service provider 704, which grants access to client device 702.

In one embodiment, a method comprises: receiving, by an identity broker (e.g., identity broker 706), a request regarding access by a client device (e.g., client device 702) to a service provided by a service provider; in response to receiving the request, determining, by the identity broker, an identity of the client device; determining, by at least one processor of the identity broker, whether the client device is in a secure state; in response to determining that the client device is in the secure state, sending, by the identity broker, an authentication request for the client device to an identity provider (e.g., identity provider 708), the authentication request including the identity of the client device; receiving, by the identity broker from the identity provider in response to the authentication request, an authentication that authorizes the access by the client device; and in response to receiving the authentication from the identity provider, sending, by the identity broker, a communication to the service provider that approves the access by the client device.

In one embodiment, the method further comprises causing a challenge to the client device to provide a client certificate, wherein determining the identity of the client device comprises identifying the client device using the client certificate.

In one embodiment, the method further comprises: receiving an indication that the client device is not able to provide the client certificate; and in response to receiving the indication that the client device is not able to provide the client certificate, initiating a procedure for the client device to obtain the client certificate.

In one embodiment, determining the identity of the client device comprises: receiving a digital certificate of the client device, wherein the digital certificate includes a name of the client device and a public encryption key; and confirming validity of the digital certificate.

In one embodiment, determining the identity of the client device comprises: receiving a digital certificate of the client device, wherein the digital certificate includes a unique device identifier and a public encryption key; and confirming validity of the digital certificate. In at least one embodiment, the unique device identifier might be globally unique to the device, (there is just one such identifier regardless of who (which app, etc.) uses the identifier). In an embodiment, the unique device identifier can be configured to appear the same to a particular app, service, or website, but different to another app, service, or websites.

In one embodiment, the method further comprises, in response to confirming validity of the digital certificate, generating a session key for use in a secure connection used by the client device to access the service.

In one embodiment, determining whether the client device is in a secure state comprises determining whether the client device is in compliance with a policy (e.g., one of policies 712).

In one embodiment, the policy is a first policy, the method further comprising: maintaining, by the identity broker, a data repository (e.g., data repository 710) of policies associated with an administrator server (e.g., admin server 1310) that provides mobile device management for the client device; receiving, by the identity broker from the administrator server, an update to the first policy; and determining, by the identity broker, whether the client device is in compliance with the update to the first policy.

In one embodiment, determining whether the client device is in a secure state comprises determining a context in which the client device is operating.

In one embodiment, the method further comprises: after the client device has been granted access to the service, monitoring the client device; determining, based on the monitoring, that the client device has become insecure; and in response to determining that the client device has become insecure, requesting that a remediation action associated with the client device be performed.

In one embodiment, determining that the client device has become insecure comprises determining that the client device is not in compliance with a policy that has been updated after the client device has been granted access to the server, or determining that a context in which the client device is operating is no longer secure.

In one embodiment, the method further comprises: after the client device has been granted access to the service, monitoring a risk level of the client device; determining whether the risk level exceeds a predetermined threshold; and in response to determining that the risk level exceeds the predetermined threshold, sending a revocation of access to at least one of the service provider or the identity provider.

In one embodiment, the method further comprises, in response to determining that the risk level exceeds the predetermined threshold, performing at least one of closing an open session of the client device with the service, or revoking at least one token of the client device that indicates a safe configuration of the client device.

In one embodiment, the client device is a first client device, and the service provider is an enterprise server that enforces policy for a plurality of client devices including the first client device, the method further comprising: receiving, by the identity broker from the enterprise server, a communication that updates the threshold; and determining whether the monitored risk level exceeds the updated threshold.

In one embodiment, determining whether the client device is in the secure state comprises determining whether a software component (e.g., security component 705) is installed on the client device, the method further comprising: in response to determining that the software component is not installed on the client device, causing a communication to the client device that requests installation of the software component, or causes automatic installation of the software component on the client device; wherein determining whether the client device is in the secure state further comprises determining that the software component has been installed on the client device.

In one embodiment, the software component generates or obtains data regarding a risk configuration of the client device, and a user action in a user interface of the client device causes the software component to send an access request to the service provider to obtain access to the service.

In one embodiment, the software component further sends the access request to the identity broker, wherein the request received by the identity broker is the access request, and determining whether the client device is in the secure state further comprises performing a security evaluation of a configuration of the client device based on data received from the software component.

In one embodiment, the request regarding access by the client device to the service is received by the identity broker from at least one of the service provider or the client device, and the method further comprises receiving, by the identity broker, aggregated information used in a security evaluation by the identity broker to determine whether the client device is in the secure state, wherein: the aggregated information comprises user authentication information and source information; and the source information includes information about at least one of: a state of an initiating or originating computing device associated with the request regarding access to the service; an attribute or identity of an application associated with the request regarding access to the service; or information from an intermediate application or computing device associated with the request regarding access to the service.

In one embodiment, the service provider is configured to solely use the identity broker for authentication of the client device as regards access to the service.

In one embodiment, a system comprises: at least one processor; and memory storing instructions configured to instruct the at least one processor to: receive a request regarding access by a client device to a service; in response to receiving the request, determine an identity of the client device; determine whether the client device is in a secure state; in response to determining that the client device is in the secure state, send an authentication request for the client device to an identity provider; receive, from the identity provider in response to the authentication request, an authentication that authorizes the access by the client device, the user associated with the client device, or the user associated with a service (i.e., application); and in response to receiving the authentication from the identity provider, send a communication that approves the access by the client device.

In one embodiment, a non-transitory computer-readable storage medium stores computer-readable instructions, which when executed, cause a computing device at least to: receive, by an identity broker, a request regarding access by a client device to a service; in response to receiving the request, determine, by the identity broker, an identity of the client device; determine, by the identity broker, whether the client device is in a secure state; in response to determining that the client device is in the secure state, send, by the identity broker, an authentication request for the client device to an identity provider, the authentication request including the identity of the client device; receive, by the identity broker from the identity provider in response to the authentication request, an authentication that authorizes the access by the client device; and in response to receiving the authentication from the identity provider, send, by the identity broker, a communication that approves the access by the client device.

In one embodiment, a method includes receiving, via a processor from an identity broker, a request regarding access by a client device to a service provided by a service provider; in response to receiving the request, determining a security state of the client device representing a risk of compromise associated with the client device; determining that the security state of the client device is a secure state representing a risk level below a threshold risk; and in response to determining that the security state of the client device is the secure state, sending, to the identity broker an indication that the client device is in the secure state indicating to the identity broker permission to authorize access by the client device to the service provider. In at least one embodiment, upon receiving the indication that the client device is in the secure state, the identity broker may perform an authentication request for the user of the device. The authentication can be performed by sending an authentication request to the client device, wherein the user of the device is prompted to enter authentication credentials (such as a username, a password, or a multi-factor authentication or a biometric authentication, or a combination of the above). The user's authentication credentials or indication that the user has authenticated using local biometrics are sent to the identity broker, which is the authentication is successful, authorizes access by the client device to the service provider, or if the authentication is not successful, either resends the authentication request, or after a preconfigured number of failed authentication attempts, revokes access for the user account.

In an embodiment, the determination of the security state includes transmitting a request for a first context to the client device. In an embodiment, the method can comprise receiving the first context from the client device, the first context representing information related to the security of the client device, and determining the security state based on the first context. In an embodiment, the method can further comprise the first context including information about an operating system of the client device. In at least one embodiment, the method can further comprise determining a second secure state, and in response to determining the second security state transmitting a second indication representing whether to permit access between the client device and the service provider. In at least one embodiment, the method can include a determined second secure state indicating compromise of the client device. In at least one embodiment, the method can further comprise determining that a component on the client device responsible for collecting information related to the first context is not initiated, and sending a request to the client device to initiate the component.

In one example, if it is determined that security component 705 is not installed on client device 702, then a webpage is presented to a user indicating that the user needs to install the security component 705. In one example, the user is directed to an application marketplace 123 for downloading the security component 705.

In one example, after determining that a client certificate is not installed on client device 702, the user is provided with a security code. In one example, the user installs a client certificate. As part of the installation, the user enters the security code into a user interface as part of the certificate installation process.

In one embodiment, identity broker 706 identifies client device 702 using a client certificate of client device 702. Identity broker 706 assigns an identifier to client device 702 based on this identification. In response to identifying client device 702, identity broker 706 causes or directs installation of security component 705 on client device 702.

In one embodiment, identity broker 806 create an identifier in response to identifying client device 802. The identifier is stored in a hardware-based store on client device 802. In one example, the identifier is stored in a trusted execution environment.

In one example, the created identifier identifies one or more sessions established between client device 702 and service provider 704. In response to determining that the risk level of client device 702 exceeds a threshold, one or more of the sessions can be revoked using the session identifier that was created. In one example, the session identifier for the session to be revoked is sent by the monitoring server to the identity broker, the monitoring server to the service provider, and/or identity broker 706 to service provider 704 and/or identity provider 708.

In one example, identity broker 706 determines from telemetry data from security component 705 that a new application has been installed on client device 702 by the user. In one example, identity broker can be notified by a monitoring server or component that determines from telemetry data from security component 705 that a new application has been installed on the client device 702 by the user. The new application has been evaluated by security component 705 and determined to be unsafe and/or violate a policy. In response to this determination from the telemetry data, security component can pass the information to the identity broker, or to a security software which passes the information to the identity broker or the service provider. In one embodiment the identity broker 706 passes one or more parameters to service provider 704 that cause termination of one or more sessions with client device 702.

In one embodiment, client device 802 listens for particular URLs or other links (e.g., associated with a domain access request by software on client device 802 in response to user input in a user interface). In one example, in response to identifying a predetermined URL or link, client device 802 forces authentication using identity broker 806 prior to permitting traffic to any domain associated with the URL or link.

In one embodiment, data from security component 705 and/or data from data repository 710 are provided to a network access control appliance. In one example, historical risk data 714 is provided to the network access control appliance. In one embodiment, identity broker 706 determines a security status of client device 702. In one embodiment, identity broker can request information from a monitoring server or component which determines a security status of client device 702. The security status is sent to the network access control appliance. In one example, the network access control appliance determines whether client device 702 is granted access to service provider 704 and/or one or more networks. In one example, the network access control appliance makes this determination based on data provided by identity broker 706.

In one embodiment, identity broker 706 or monitoring server or component uses behavioral biometrics associated with client device 702 as part of the initial risk assessment and/or continuous risk monitoring after granting access to a service. In some embodiments the identity broker can include a traditional identity broker coupled to a monitoring server/component. The behavioral biometric measurements can be used to assess the likelihood that the user operating the device is the same as the user who has previously provided a set of credentials or who has previously used the given device (for initial risk assessment); or the behavioral biometric measurements can be used to provide a continuous assessment as to the likelihood that the same or a different user is operating that device compared to the user who had been operating the device at the time of the initial or most recent authentication or at the time of recent behavioral biometric measurements.

Various embodiments of the present disclosure discussed below provide one or more technological solutions to the above technical problems. In various embodiments, an intermediary service can be used to continuously monitor security for a client device. In one embodiment, the security is assessed prior to granting access to the service. After access has been granted, the security of the client device is monitored in real-time as long as the client device has access to the service. If a risk is identified, the client device is denied access, or its access is revoked.

Amongst other features, a continuous conditional access service can include phishing protection. DNS requests sent from a mobile device typically do not contain any information about which enterprise's custom blacklist should be used for performing DNS resolution. It would be desirable for a DNS server to have that information so that custom blacklisting could be supported. In at least one embodiment, the mobile device can be a client device.

A service associated with a mobile device can be configured to send a specially crafted DNS request to the DNS server which conveys the association information to the DNS server. The DNS server can then determine that a particular IP address. The IP address can appear as the sender of the DNS request packet to the DNS server is to be associated with Enterprise XYZ, and that therefore the custom blacklist for Enterprise XYZ will be used for all DNS requests coming from that particular IP address.

The service associated with the mobile device can on each change of network connection (e.g., from cellular to Wi-Fi, or vice versa, or from one Wi-Fi to another), send a custom request to the DNS server. In at least one embodiment, the service is a security competent. The custom request can be a request to resolve the IP for a specially constructed name. This specially constructed name could look like: thisismyip.forcustomblacklisting.forenterprise. example.com.lookout.com The special prefix of "thisismyip.forcustom blacklisting.forenterprise." can be tell the DNS server that this is a special DNS request intended to make the association of an IP (the device's IP) with a particular enterprise. The DNS request UDP packet can contains the IP address of the sender, which the DNS server uses to respond to the request. The middle part of the special DNS resolution request "example.com" can identify which enterprise's custom blacklist should be used to modify responses to DNS requests coming from the particular IP address. In at least one embodiment the last part ".lookout.com" can also be a part of the special request. The TTL on the response can be used to tell the service associated with the mobile device that it should re-send the special request at the expiration of that TTL, or upon a change in network connection, whichever comes first. This gives a way to "expire" the IP-enterprise association information from the DNS server so it doesn't have to keep this info forever. Additional information can be in the special request, including an encrypted token which can indicate that the request is actually coming from the Lookout app and not from anywhere else.

In at least one embodiment, a certificate associated with a mobile device can be used to identify the DNS blacklist associated with the mobile device. In at least one other embodiment, the security event associated with the revocation of the mobile device access to one or more applications can be associated with whether the IP enterprise association is "expired."

The security component or security software on the client device can be configured to communicate with the monitoring server. The communication can include the security state of the client device. When a disconnect occurs between the security component on client device, and the server security component on the server, the security state of the device may not be communicated to the server security component and therefore the benefit of having the security component on the device is diluted. It would be desirable to reconnect the connection between the security component on the client device and monitoring server. A disconnect may occur because the operating system of the device prevented the security component or security software on the client device from running in the background, or may occur because the user of the device, either unprompted or after being prompted by the operating system to prevent the security component or security software on the client device from running in the background, e.g., said prompt optionally including a message that the security component or security software is consuming device resources and asking if the user desires to terminate execution of the security component or security software, or for other reasons. In any case, the security component or security software has been prevented from running in the background by the operating system, and therefore cannot communicate the security state of the device to the monitoring server. This situation can only be remedied by the user manually opening the security component or security software, possibly in response to a prompt sent by the monitoring server to the device, e.g., via email or SMS or via some other messaging channel.

In at least one embodiment, the security component or security software includes a VPN permission. The VPN permission indicates to the operating system that the operating system should allow the security component or security software to run in the background so that it is available to perform VPN related functions when needed. The security component or the security software may always keep a VPN session open, or may periodically establish a VPN connection according to configured conditions. In any case, the fact that the security component or security software has used a VPN permission enables the security component or security software to continue its periodic updates regarding the security state of the device to the monitoring server, preventing the disconnect situation in which the monitoring server no longer knows what the security state of the device currently is.

In at least one embodiment, when the security component on the client device loses connection with the monitoring server, the client device can determine that the security component on the device isn't transmitting a request or isn't connected to a monitoring server, and in response can be configured to initiate the security component on the client device. In at least one embodiment, the client device can determine that the security component on the client device is not working correctly and can initiate steps to fix the security component on the client device. The steps can include reinstalling the security component, sending a message to the client device with instructions for the user of the device to open the security component or security software, sending a message to the client device with a link which when clicked/tapped by the user of the device opens the security component or security software, reviewing access permissions, and reviewing network connectivity.

In an embodiment, a VPN connection can configure between the client security component and monitoring server. In at least one embodiment the client security component is configured as a VPN on the device. In another embodiment, the client security component is configured to have VPN access/permission on the device.

In an embodiment, the app containing the security component or security software does not have the VPN permission, which enables an app to run in the background, but an app which does have the VPN permission (the VPN app) is aware of the app which contains the security component or security software (the security app), and the VPN app periodically wakes up the security app (which may be unable to run in the background), by deep linking to the security app, or calling an activity in the security app. In a similar embodiment, the VPN app periodically determines whether the security app is running, and if the security app is not running, the VPN app wakes up the security app as described above. In another embodiment, the monitoring server sends a message to the VPN app, requesting the VPN app to wake up the VPN app, and then the VPN app wakes up the security app. In the above, any other app which has the ability to run persistently in the background can play the role of the VPN app in waking up the security app.

CLOSING

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by a computing device.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computing device or other system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a computing device causes the device to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible or non-transitory machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by a computing device.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method comprising:
   receiving, via a processor from an identity broker, a request regarding access by a client device to a service provided by a service provider;
   in response to receiving the request, determining a first security state of the client device representing a risk of compromise associated with the client device;
   determining that the first security state of the client device is a secure state representing a risk level below a threshold risk;
   in response to determining that the first security state of the client device is the secure state, sending to the identity broker an indication that the client device is in the secure state indicating to the identity broker permission to authorize direct access by the client device to the service provider, wherein the identity broker is configured to, in response to receiving the permission, send a communication to the service provider that approves the direct access by the client device;
   determining that the client device has changed to a new security state; and
   in response to determining that the client device has changed to the new security state, replacing a component of an application in the client device corresponding to the new security state.

2. The method of claim 1, wherein the determination of the first security state includes transmitting a request for a first context to the client device.

3. The method of claim 2, further comprising receiving the first context from the client device, the first context representing information related to the security of the client device, and determining the first security state based on the first context.

4. The method of claim 3, wherein the first context includes information about an operating system of the client device.

5. The method of claim 3, further comprising determining a second security state, and in response to determining the second security state transmitting a second indication representing whether to permit access between the client device and the service provider.

6. The method of claim 5, wherein the determined second security state indicates compromise of the client device.

7. The method of claim 3, further comprising determining that a component on the client device responsible for collecting information related to the first context is not initiated, and sending a request to the client device to initiate the component.

8. A system comprising:
   at least one processor; and
   memory storing instructions configured to instruct the at least one processor to:
   receive, from an identity broker, a request regarding access by a client device to a service provided by a service provider;
   in response to receiving the request, determine a first security state of the client device representing a risk of compromise associated with the client device;
   determine that the first security state of the client device is a secure state representing a risk level below a threshold risk;
   in response to determining that the first security state of the client device is the secure state, send to the identity broker an indication that the client device is in the secure state indicating to the identity broker permission to authorize direct access by the client device to the service provider, wherein the identity broker is configured to, in response to receiving the permission, send a communication to the service provider that approves the direct access by the client device;
   determine that the client device has changed to a new security state; and
   in response to determining that the client device has changed to the new security state, replace a component of an application in the client device corresponding to the new security state.

9. The system of claim 8, wherein the determination of the first security state includes transmitting a request for a first context to the client device.

10. The system of claim 9, wherein the instructions are further configured to instruct the processor to receive the first context from the client device, the first context representing information related to the security of the client device, and determining the first security state based on the first context.

11. The system of claim 10, wherein the first context includes information about an operating system of the client device.

12. The system of claim 10, wherein the instructions are further configured to instruct the processor to determine a second security state, and in response to determining the second security state transmit a second indication representing whether to permit access between the client device and the service provider.

13. The system of claim 12, wherein the determined second security state indicates compromise of the client device.

14. The system of claim 10, wherein the instructions are further configured to instruct the processor to determine that a component on the client device responsible for collecting information related to the first context is not initiated, and send a request to the client device to initiate the component.

15. A non-transitory computer-readable storage medium storing computer-readable instructions, which when executed, cause a computing device at least to:
   receive, from an identity broker, a request regarding access by a client device to a service provided by a service provider;
   in response to receiving the request, determine a first security state of the client device representing a risk of compromise associated with the client device;
   determine that the first security state of the client device is a secure state representing a risk level below a threshold risk;
   in response to determining that the first security state of the client device is the secure state, send to the identity broker an indication that the client device is in the secure state indicating to the identity broker permission to authorize a direct access by the client device to the service provider, wherein the identity broker is configured to, in response to receiving the permission, send a communication to the service provider that approves the direct access by the client device;
   determine that the client device has changed to a new security state; and
   in response to determining that the client device has changed to the new security state, replace a component of an application in the client device corresponding to the new security state.

16. The non-transitory computer-readable storage medium of claim 15, wherein the determination of the first security state includes transmitting a request for a first context to the client device.

17. The non-transitory computer-readable storage medium of claim 16, wherein the instructions further cause the computing device to receive the first context from the client device, the first context representing information related to the security of the client device, and determine the first security state based on the first context.

18. The non-transitory computer-readable storage medium of claim 17, wherein the first context includes information about an operating system of the client device.

19. The non-transitory computer-readable storage medium of claim 17, wherein the instructions further cause the computing device to determine a second security state, and in response to determining the second security state transmit a second indication representing whether to permit access between the client device and the service provider.

20. The non-transitory computer-readable storage medium of claim 19, wherein the determined second security state indicates compromise of the client device.

21. The non-transitory computer-readable storage medium of claim 17, wherein the instructions further cause the computing device to determine that a component on the client device responsible for collecting information related to the first context is not initiated, and send a request to the client device to initiate the component.

* * * * *